US011451177B2

(12) United States Patent
Ohashi

(10) Patent No.: US 11,451,177 B2
(45) Date of Patent: Sep. 20, 2022

(54) IMAGE FORMING APPARATUS CONFIGURED TO CONTROL MOTOR BASED ON CONTROL VALUE SET ACCORDING TO TYPE OF MOTOR

(71) Applicant: CANON KABUSHIKI KAISHA, Tokyo (JP)

(72) Inventor: Yohei Ohashi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 73 days.

(21) Appl. No.: 17/064,433

(22) Filed: Oct. 6, 2020

(65) Prior Publication Data
US 2021/0135615 A1  May 6, 2021

(30) Foreign Application Priority Data

Oct. 30, 2019 (JP) .............................. JP2019-198006
Aug. 3, 2020 (JP) .............................. JP2020-131915

(51) Int. Cl.
G03G 15/00 (2006.01)
H02P 21/22 (2016.01)
H02P 21/18 (2016.01)

(52) U.S. Cl.
CPC .............. H02P 21/22 (2016.02); G03G 15/80 (2013.01); H02P 21/18 (2016.02)

(58) Field of Classification Search
USPC ........................................................ 399/88
See application file for complete search history.

(56) References Cited

U.S. PATENT DOCUMENTS

| 5,317,367 A | * | 5/1994 | Pierce | ................... G03G 15/50 399/38 |
| 2020/0235689 A1 | * | 7/2020 | Miyashita | .......... G03G 15/5004 |
| 2021/0247713 A1 | * | 8/2021 | Nito | ........................ H02P 21/22 |

FOREIGN PATENT DOCUMENTS

JP      2017046469 A    3/2017

* cited by examiner

Primary Examiner — Quana Grainger
(74) Attorney, Agent, or Firm — Canon U.S.A., Inc. I.P. Division

(57) ABSTRACT

An image forming apparatus includes a power source, a motor, a motor control device, a first switching element, a controller, a detector, a discriminator, and a first setting unit configured to set a control value. The motor control device includes a phase determiner configured to determine a rotational phase by using the control value, and a second setting unit. The motor control device includes a first mode and a second mode. The discriminator discriminates a type of the motor in the first mode. The motor control device executes the first mode if the controller controls the first switching element in response to supplying of the power. The motor control device does not execute the first mode even if the power is supplied to a driving circuit, when the controller controls the first switching element in response to inputting of a trigger signal.

19 Claims, 12 Drawing Sheets

IMAGE FORMING APPARATUS CONFIGURED TO CONTROL MOTOR BASED ON CONTROL VALUE SET ACCORDING TO TYPE OF MOTOR

BACKGROUND

Field of the Disclosure

The present disclosure generally relates to an image forming apparatus that discriminates a type of a motor.

Description of the Related Art

A configuration of discriminating a type of a motor connected to a motor control device that controls the motor has been conventionally known. Japanese Patent Application Laid-Open No. 2017-46469 discusses execution of processing to discriminate a type of a motor (hereinafter referred to as determination processing) by supplying current to the motor when an image forming apparatus is powered ON. Discriminating the type of the motor at the time of the power-ON enables appropriate control for the motor mounted on the image forming apparatus. This can prevent the motor from losing synchronization while the image forming apparatus is executing a job.

Typically, the motor is replaced in a state where power is not supplied (e.g., a state where the image forming apparatus is powered OFF) to devices in the image forming apparatus (a driving circuit that supplies current to the motor and a central processing unit (CPU) that controls power in the image forming apparatus). This is to secure the safety of an operator who exchanges the motor.

In a configuration illustrated in Japanese Patent Application Laid-Open No. 2017-46469, there is a possibility that the determination processing is executed not only in a case where the image forming apparatus is switched from a power-OFF state to a power-ON state, but also in a case where a power supply state shifts from a state where power is not supplied to the driving circuit but is supplied to the CPU (first state) to a state where power is supplied to the driving circuit and the CPU (second state) (i.e., in a case where the motor is not replaced). In this case, in the configuration of Japanese Patent Application Laid-Open No. 2017-46469, there is a possibility that the determination processing is executed even if it is not necessary. Because the determination processing includes processing to supply current to the motor, it requires a predetermined time period to complete the determination processing. Accordingly, in the configuration of Japanese Patent Application Laid-Open No. 2017-46469, the determination processing that is executed even if it is not necessary results in elongation of time required until the image forming apparatus becomes operable after the power supply state shifts from the first state to the second state, in comparison with a case where the determination processing is not executed when the power supply state shifts from the first state to the second state.

SUMMARY

In view of the above issues, an aspect of the present disclosure is to apply a technique capable of preventing the elongation of time required until the image forming apparatus that discriminates a type of the motor connected to the driving circuit becomes operable after power is supplied to the driving circuit.

According to an aspect of the present disclosure, An image forming apparatus including an image forming unit configured to form an image on a recording medium, includes a power source to be connected to an external power source and configured to be supplied with power from the external power source, a motor configured to drive a load, a motor control device including a driving circuit, to which a winding of the motor is connected, and that is configured to supply driving current to the winding based on power supplied from the power source, a first switching element configured to be switched between a first state in which the power is supplied from the power source to the driving circuit and a second state in which the power is not supplied from the power source to the driving circuit, a controller configured to operate with power supplied from the power source and control a state of the first switching element, a detector configured to detect driving current flowing through the winding, a discriminator configured to discriminate a type of the motor connected to the driving circuit based on the driving current detected by the detector, and a first setting unit configured to set a control value corresponding to the type of the motor discriminated by the discriminator, wherein the motor control device includes a phase determiner configured to determine a rotational phase of a rotor of the motor by using the driving current detected by the detector and the control value set by the first setting unit, and a second setting unit configured to set a target value of current to be supplied to the winding so as to decrease a deviation between the rotational phase determined by the phase determiner and an instructed phase representing a target phase of the rotor of the motor, wherein the motor control device includes a first mode in which the driving circuit supplies predetermined current to the winding, and a second mode in which the driving circuit supplies driving current corresponding to the target value set by the second setting unit to the winding, wherein the discriminator is configured to discriminate the type of the motor connected to the driving circuit based on the driving current detected by the detector in the first mode, wherein the motor control device is configured to execute the first mode in a case where the controller controls the first switching element to shift to the first state in response to the power being supplied to the controller in a state where the first switching element is in the second state, and wherein the motor control device is configured not to execute the first mode even if the power is supplied to the driving circuit caused by switching of the first switching element from the second state to the first state, in a case where the controller controls the first switching element to shift to the first state in response to inputting of a trigger signal to the controller in a state where the power is supplied to the controller and the first switching element is in the second state, wherein the trigger signal serves as a trigger to supply the power to the driving circuit.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings. Note that shapes of components described in the exemplary embodiments, relative positions thereof, and the like should be changed as appropriate according to a configuration of an apparatus to which the present disclosure is applied and various conditions, and the scope of the present disclosure is not limited to the exemplary embodiments described below. While a description will be given below of a case where a motor control device is mounted on an image forming apparatus, an apparatus on which the motor control device is mounted is not limited to the image forming apparatus. For example, the motor control device is used, for example, for a sheet conveyance device that conveys a sheet such as a recording medium and a document.

[Image Forming Apparatus]

Figure 1:
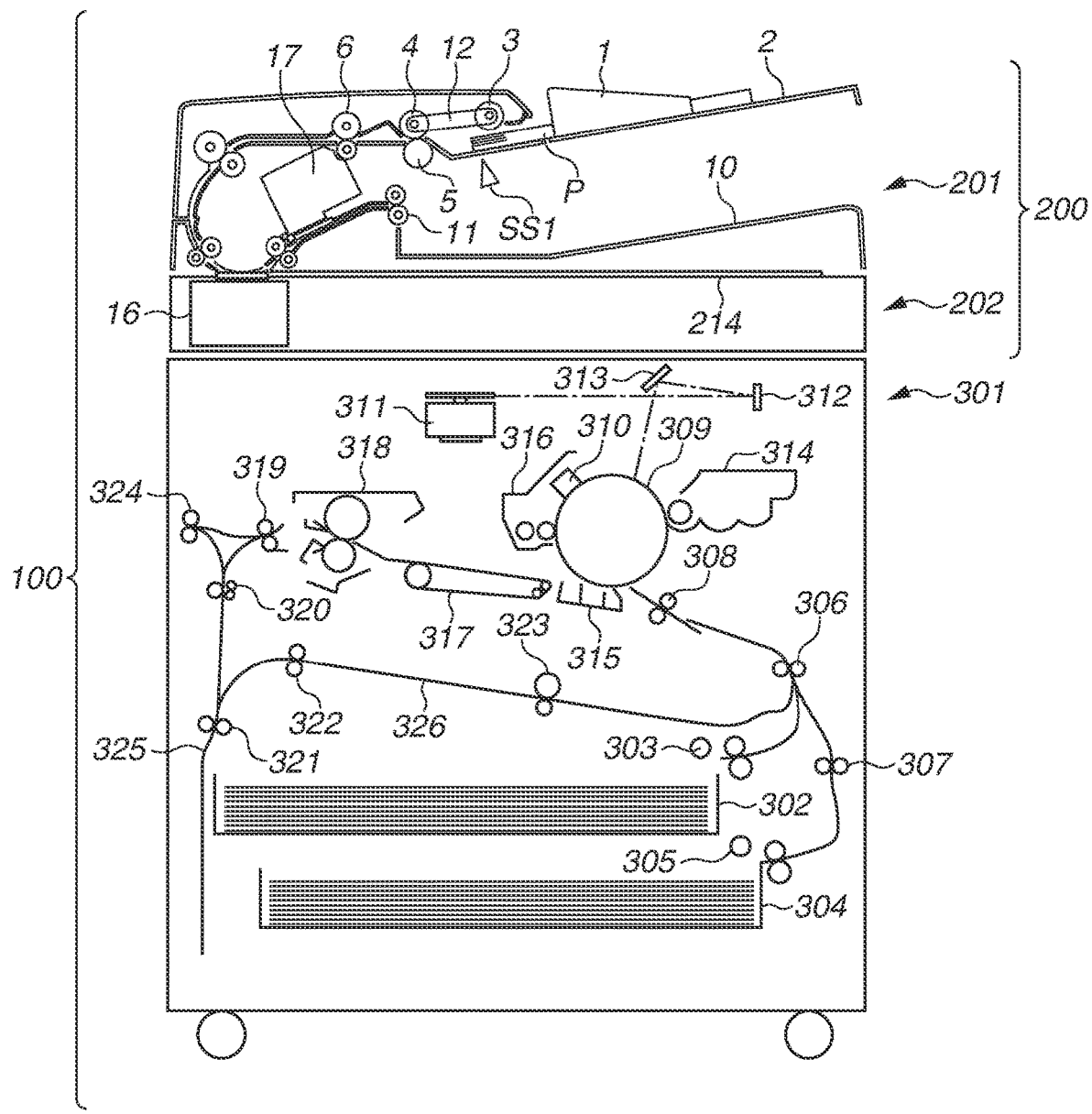
FIG. 1 is a cross section diagram illustrating an image forming apparatus according to a first exemplary embodiment.

FIG. 1 is a cross section diagram illustrating a configuration of a monochrome electrophotographic copy machine (hereinafter referred to as an image forming apparatus) 100 including a sheet conveyance device used in a first exemplary embodiment. The image forming apparatus is not limited to the copy machine, and may be, for example, a facsimile machine, a printing machine, and a printer. A recording method is not limited to an electrophotographic method, and may be, for example, an ink-jet method. Furthermore, the image forming apparatus may be either a monochrome image forming apparatus or a color image forming apparatus.

A description will be given of the configuration and functions of the image forming apparatus 100 with reference to FIG. 1. As illustrated in FIG. 1, the image forming apparatus 100 includes a document reading apparatus 200 and an image printing apparatus 301. The document reading apparatus 200 includes a document feeding device 201 and a reading device 202. The document feeding device 201 is rotatable with respect to the reading device 202.

<Document Reading Apparatus>

Documents P loaded on a document loading unit 2 of the document feeding device 201 are fed by a pickup roller 3 one by one, and then conveyed downstream by a feeding roller 4. A separating roller 5, which is in pressure-contact with the feeding roller 4, is arranged at a position facing the feeding roller 4. The separating roller 5 is configured to rotate when a load torque larger than a predetermined torque is applied to the separating roller 5, and has a function to separate documents fed in a state where two sheets overlap.

The pickup roller 3 and the feeding roller 4 are coupled to each other by a swing arm 12. The swing arm 12 is supported by a rotation shaft of the feeding roller 4 so as to be rotatable about the rotation shaft of the feeding roller 4.

The document P is conveyed by various conveyance rollers such as the feeding roller 4 and a conveyance roller 6, and is discharged to a discharge tray 10 by a discharge roller 11.

The reading device 202 is provided with a document reading portion 16 that reads an image on a first side of the conveyed document. Image information read by the document reading portion 16 is output to the image printing apparatus 301.

The document feeding device 201 is provided with a document reading portion 17 that reads an image on a second side of the conveyed document. Image information read by the document reading portion 17 is output to the image printing apparatus 301 in a manner similar to the method described with respect to the document reading portion 16.

The document is read as described above.

Reading modes of the document include a first reading mode and a second reading mode. The first reading mode is a mode to read an image on the document conveyed by the method described above. The second reading mode is a mode to read an image on the document loaded on a document glass plate 214 (transparent member) by the document reading portion 16 that moves at a constant speed. The document is placed on the document glass plate 214 in a state where the document feeding device 201 is rotated with respect to the reading device 202. Typically, an image on a sheet-like document is read in the first reading mode and an image on bound documents such as a book and a booklet is read in the second reading mode.

<Image Printing Apparatus>

Sheet storage trays 302 and 304 are arranged in the image printing apparatus 301. The sheet storage trays 302 and 304 can store different types of recording media. For example, A4 size plain paper is stored in the sheet storage tray 302, and A4 size thick paper is stored in the sheet storage tray 304. As the recording medium, paper, a resin sheet, a cloth, an overhead projector (OHP) sheet, and a label, on which an image is formed by the image forming apparatus 100, are included.

The recording medium stored in the sheet storage tray 302 is fed by a pickup roller 303 and conveyed to a registration roller 308 by a conveyance roller 306. Further, the recording medium stored in the sheet storage tray 304 is fed by a pickup roller 305 and conveyed to the registration roller 308 by a conveyance roller 307 and the conveyance roller 306.

An image signal output from the document reading apparatus 200 is input to an optical scanning device 311 that includes a semiconductor laser and a polygon mirror. An outer circumferential surface of a photoconductive drum 309 is electrostatically charged by a charger 310. After electrostatically charged, the outer circumferential surface of the photoconductive drum 309 is irradiated with laser light corresponding to the image signal input from the document reading apparatus 200 to the optical scanning device 311. The laser light is emitted from the optical scanning device 311 to the outer circumferential surface of the photoconductive drum 309 via polygon mirror, and mirrors 312 and 313. As a result, an electrostatic latent image is formed on the outer circumferential surface of the photoconductive drum 309.

Subsequently, the electrostatic latent image is developed with toner stored in a developing device 314, and then a toner image is formed on the outer circumferential surface of the photoconductive drum 309. The toner image formed on the photoconductive drum 309 is transferred onto the recording medium by a transfer charging device 315 arranged at a position facing the photoconductive drum 309 (transfer position). The registration roller 308 conveys the recording medium to the transfer position in synchronization with a transfer timing at which the image is transferred onto the recording medium by the transfer charging device 315.

As described above, the recording medium to which the toner image is transferred is conveyed to a fixing unit 318 by a conveying belt 317, and is pressured and heated to fix the toner image on the recording medium. In this manner, the image is formed on the recording medium by the image forming apparatus 100.

In a case where the image forming is performed in a one-side printing mode, the recording medium that has passed through the fixing unit 318 is discharged to a discharge tray (not illustrated) by discharge rollers 319 and 324. In a case where the image forming is performed in a double-sided printing mode, after fixing processing on the first side of the recording medium is performed by the fixing unit 318, the recording medium is conveyed to a reverse path 325 by the discharge roller 319, a conveyance roller 320, and a reverse roller 321. Then, the recording medium is conveyed again to the registration roller 308 by conveyance rollers 322 and 323, and an image is formed on the second side of the recording medium by the method described above. Thereafter, the recording medium is discharged to a discharge tray (not illustrated) by the discharge rollers 319 and 324.

In a case where the recording medium with the image formed on the first side thereof is discharged face-down to the outside of the image forming apparatus 100, the recording medium, which has passed through the fixing unit 318, is conveyed toward the conveyance roller 320 through the discharge roller 319. Then, reversing the rotation of the conveyance roller 320 immediately before a trailing end of the recording medium passes through a nip portion of the conveyance roller 320 causes the recording medium with the first side facing down to be discharged to the outside of the image forming apparatus 100 via the discharge roller 324.

The description has been given of the configuration and functions of the image forming apparatus 100. Various rollers such as the pickup rollers 3, 303, and 305, and the registration roller 308, the photoconductive drum 309, the developing device 314, the conveying belt 317, and the like correspond to loads. The motor control device according to the present exemplary embodiment can be applied to a motor that drives these loads.

<Control Configuration of Image Forming Apparatus>

Figure 2:
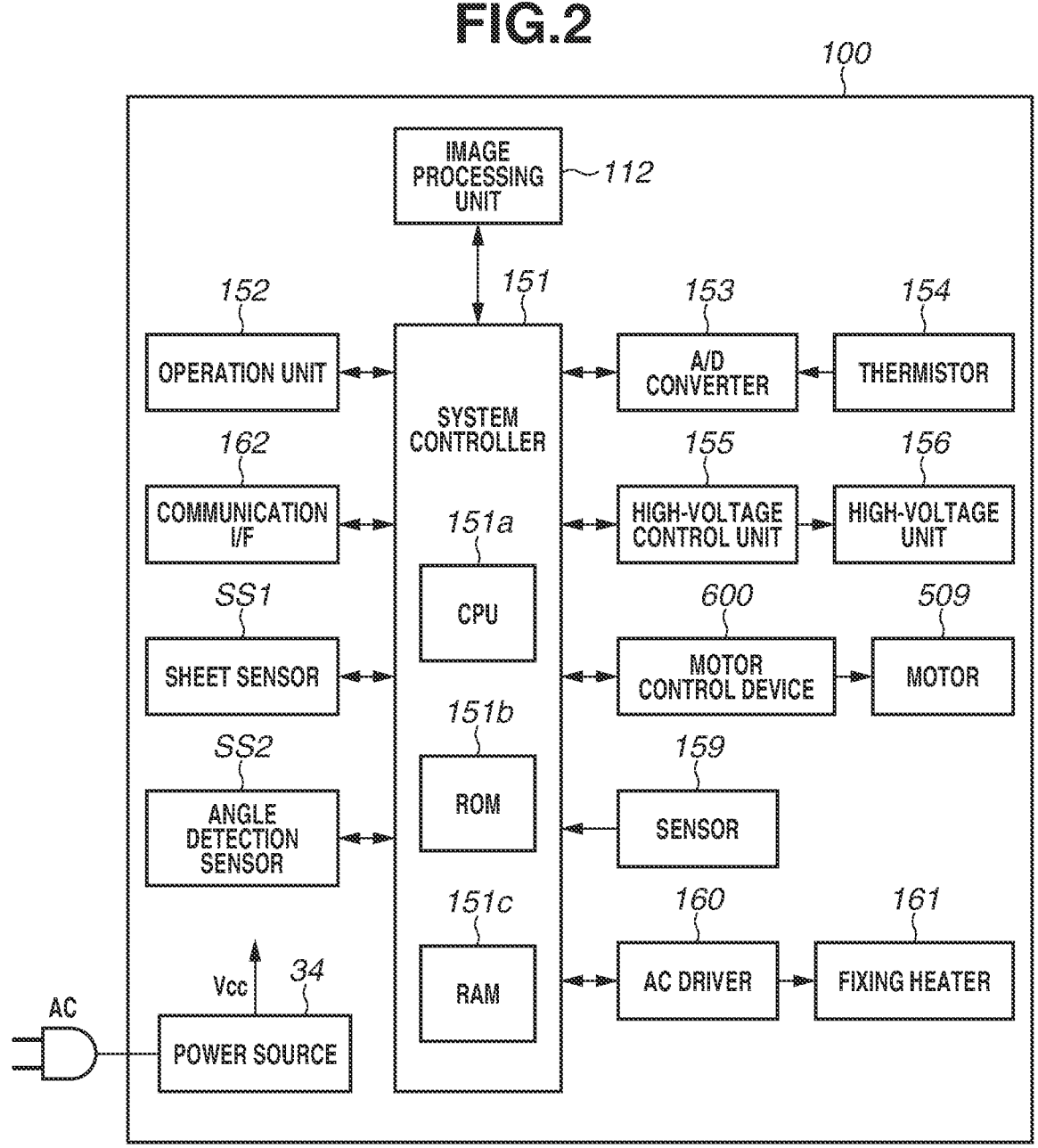
FIG. 2 is a block diagram illustrating a control configuration of the image forming apparatus.

FIG. 2 is a block diagram illustrating a control configuration example of the image forming apparatus 100. As illustrated in FIG. 2, the image forming apparatus 100 is provided with a power source 34. The power source 34 is connected to an alternating-current source (external power source) AC, and various devices in the image forming apparatus 100 operate with power output from the power source 34.

A system controller 151 includes a central processing unit (CPU) 151a, a read-only memory (ROM) 151b, and a random-access memory (RAM) 151c, as illustrated in FIG. 2. The system controller 151 is connected to an image processing unit 112, an operation unit 152, an analog-digital (A/D) converter 153, a high-voltage control unit 155, a motor control device 600, a sensor 159, an AC driver 160, a communication interface (I/F) 162, a sheet sensor SS1, and an angle detection sensor SS2. The system controller 151 can transmit and receive data and commands to and from each of the units connected thereto.

The CPU 151a reads and executes various programs stored in the ROM 151b to implement various sequences regarding a predetermined image forming sequence.

The RAM 151c is a storage device. A variety of data such as setting values for the high-voltage control unit 155, instructed values for the motor control device 600, and information received from the operation unit 152 is stored in the RAM 151c.

The system controller 151 transmits data of setting values for the various devices, which are arranged in the image forming apparatus 100, to the image processing unit 112. The data of the setting values is necessary for image processing in the image processing unit 112. Furthermore, the system controller 151 receives a signal from the sensor 159, and sets a setting value of the high-voltage control unit 155 based on the received signal.

The high-voltage control unit 155 supplies a required voltage to a high-voltage unit 156 (charger 310, developing device 314, and transfer charging device 315) based on the setting values set by the system controller 151.

The motor control device 600 controls a motor 509 that drives the loads arranged in the image printing apparatus 301 in response to a command output from the CPU 151a. While FIG. 2 illustrates only the motor 509 as the motor that drives the loads, the image forming apparatus 100 is provided with a plurality of motors in practice. The image forming apparatus 100 may be configured to control the plurality of motors by one motor control device. Furthermore, while only one motor control device is provided in FIG. 2, the image forming apparatus 100 is provided with a plurality of motor control devices in practice.

The A/D converter 153 receives a detection signal detected by a thermistor 154 to detect temperature of a fixing heater 161, converts the detection signal from an analog signal to a digital signal, and transmits the converted digital signal to the system controller 151. The system controller 151 controls the AC driver 160 based on the digital signal received from the A/D converter 153. The AC driver 160 controls the fixing heater 161 to set the temperature of the fixing heater 161 to a temperature required to execute the fixing processing. The fixing heater 161 is a heater used for the fixing processing, and is included in the fixing unit 318.

The communication I/F 162 receives data from a communication deice disposed outside the image forming apparatus 100. More specifically, the communication I/F 162 receives, for example, an image forming job to be executed by the image forming apparatus 100 from the communication device disposed outside the image forming apparatus 100. The communication I/F 162 notifies the CPU 151a of a reception result.

The sheet sensor SS1 is a sensor that detects the presence/absence of a document loaded on the document loading unit 2. The sheet sensor SS outputs a detection result to the CPU 151a.

The angle detection sensor SS2 detects whether an opening/closing angle of the document feeding device 201 with respect to the reading device 202 is a predetermined angle or larger, and notifies the CPU 151a of a detection result.

The system controller 151 controls the operation unit 152 to cause a display unit arranged on the operation unit 152 to display an operation screen, through which a user sets a type of a recording medium to be used (hereinafter referred to as type of paper). The system controller 151 receives information set by the user from the operation unit 152, and controls an operation sequence of the image forming apparatus 100 based on the information set by the user. Furthermore, the system controller 151 transmits information indicating the state of the image forming apparatus 100 to the operation unit 152. The information indicating the state of the image forming apparatus 100 is, for example, information regarding the number of sheets on which an image is formed, the progress of an image forming operation, a sheet jam or double feeding in the image printing apparatus 301 and the document feeding device 201. The operation unit 152 causes the display unit to display information received from the system controller 151.

The system controller 151 controls the operation sequence of the image forming apparatus 100 as described above.

[Motor Control Device]

Next, the motor control device 600 according to the present exemplary embodiment will be described. The motor control device 600 according to the present exemplary embodiment controls the motor 509 by vector control as a second mode. While a motor A or a motor B that is different in type from the motor A can be mounted as the motor 509 on the image forming apparatus 100 in the present exemplary embodiment, a description will be given of a configuration in which the motor A is connected as the motor 509 to the motor control device 600.

<Vector Control>

First, a description will be given of a method in which the motor control device 600 according to the present exemplary embodiment performs the vector control with reference to FIGS. 4 and 5. The motor in the following description is not provided with a sensor such as a rotary encoder to detect a rotational phase of a rotor of the motor.

Figure 3:
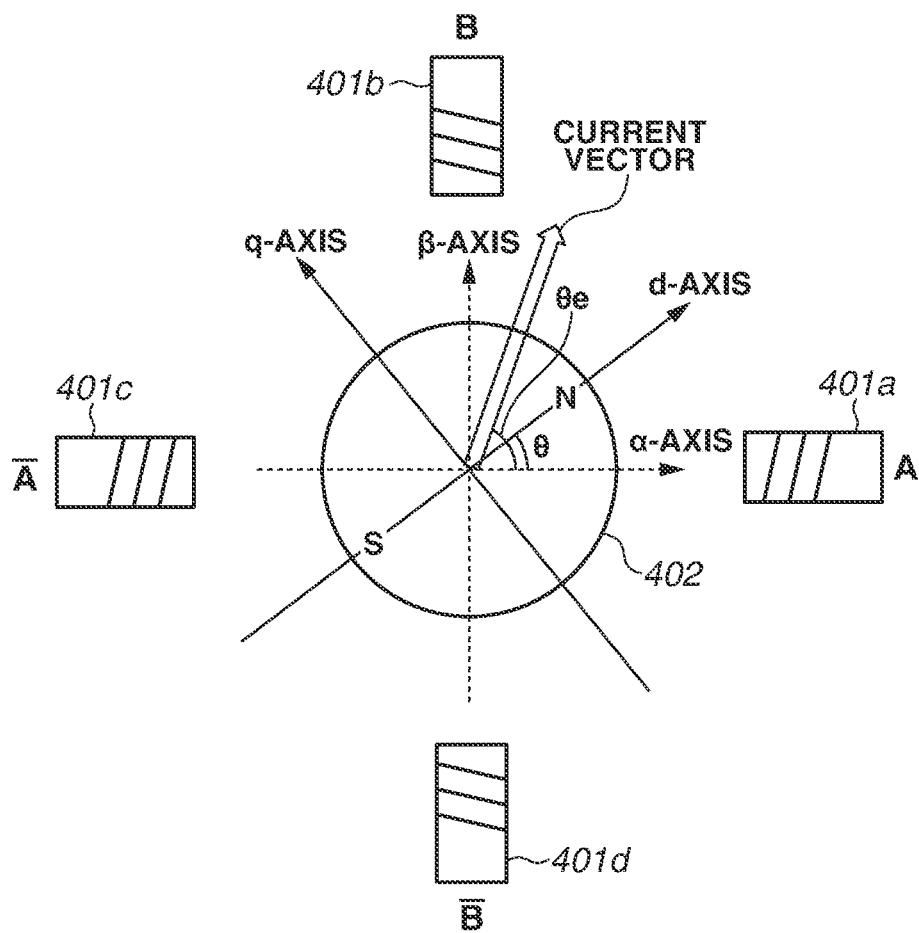
FIG. 3 is a diagram illustrating a relationship between a two-phase (A- and B-phases) motor, and d- and q-axes in a rotational coordinate system.

FIG. 3 is a diagram illustrating a relationship between a stepping motor (hereinafter referred to as a motor) 509 composed of two phases, i.e., an A-phase (first phase) and a B-phase (second phase), and a rotational coordinate system represented by d- and q-axes. In FIG. 3, an α-axis corresponding to a winding wire for the A-phase and a β-axis corresponding to a winding wire for the B-phase are defined in a coordinate system at rest. In FIG. 3, the d-axis is defined along a direction of a magnetic flux generated by a magnetic pole of a permanent magnet used in a rotor 402, and the q-axis is defined along a direction advancing by 90 degrees counterclockwise from the d-axis (direction orthogonal to the d-axis). An angle between the α- and d-axes is defined as an angle θ, and a rotational phase of the rotor 402 is represented by the angle θ. In the vector control, the rotational coordinate system using a rotational phase θ of the rotor 402 is employed as a reference. More specifically, in the vector control, out of current components in the rotational coordinate system of a current vector corresponding to driving current flowing through the winding wire, a q-axis component (torque current component) that produces a torque in the rotor, and a d-axis component (excitation current component) that affects an intensity of a magnetic flux penetrating through the winding wire, are used.

The vector control is a control method of controlling the motor by performing phase feedback control to control a value of the torque current component and a value of the excitation current component so as to decrease a deviation between an instructed phase representing a target phase of the rotor and an actual rotational phase. Alternatively, there is a method of controlling the motor by performing speed feedback control to control the value of the torque current component and the value of the excitation current component so as to decrease a deviation between an instructed speed representing a target speed of the rotor and an actual rotational speed.

Figure 4:
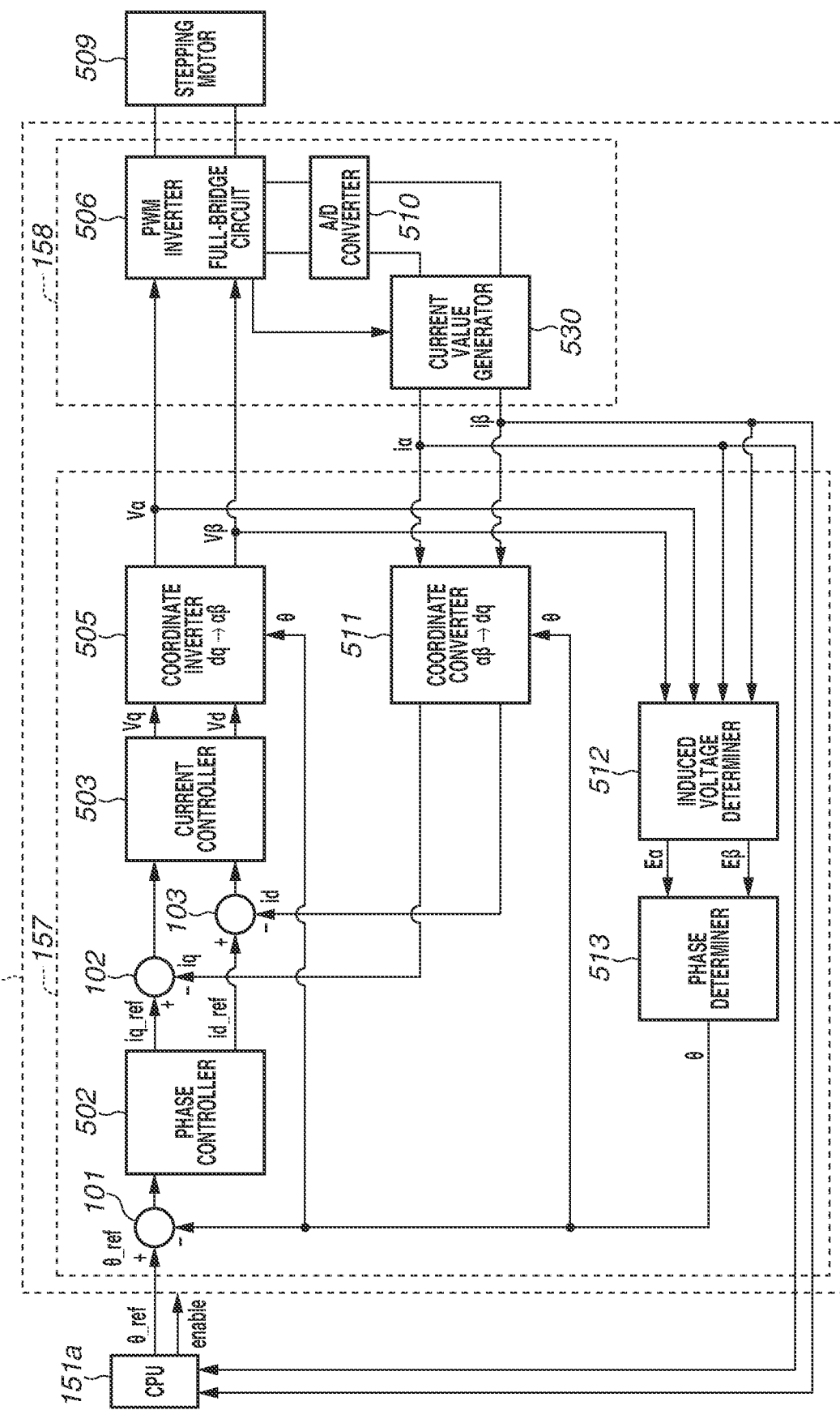
FIG. 4 is a block diagram illustrating a configuration of a motor control device.

FIG. 4 is a block diagram illustrating a configuration example of the motor control device 600 that controls the motor 509. The motor control device 600 according to the present exemplary embodiment is composed of a motor control unit 157 that controls the motor using the vector control, and a motor driving unit 158 that drives the motor by supplying driving current to the winding wire of the motor. The motor control device 600 is composed of at least one application-specific integrated circuit (ASIC), and executes functions described below.

The motor control unit 157 includes, as circuits to perform the vector control, a phase controller 502, a current controller 503, a coordinate inverter 505, and a coordinate converter 511. The coordinate converter 511 coverts coordinates of the current vector corresponding to the driving current flowing through each of the winding wires in the A- and B-phases of the motor 509 from the coordinate system at rest represented by the α- and β-axes to the rotational coordinate system represented by the q- and d-axes. As a result, the driving current flowing through each of the winding wires is represented by a current value of the q-axis component (q-axis current) and a current value of the d-axis component (d-axis current) that are current values in the rotational coordinate system. The q-axis current corresponds to the torque current that produces torque in the rotor 402 of the motor 509. The d-axis current corresponds to the excitation current that affects an intensity of a magnetic flux penetrating through the winding wire of the motor 509. The motor control device 600 can control each of the q-axis current and the d-axis current independently. As a result, the motor control unit 157 can produce torque required to rotate the rotor 402 by controlling the q-axis current according to a load torque applied to the rotor 402. In other words, in the vector control, a magnitude of the current vector illustrated in FIG. 3 changes depending on the load torque applied to the rotor 402.

The motor control unit 157 determines the rotational phase θ of the rotor 402 of the motor 509 by a method described below, and performs the vector control based on a result of the determination. The CPU 151a generates an instructed phase θ_ref representing the target phase of the rotor 402 of the motor 509, and outputs the instructed phase θ_ref to the motor control device 600. In practice, the CPU 151a outputs a pulse signal to the motor control device 600. The number of pulses corresponds to the instructed phase, and a frequency of a pulse corresponds to the target speed. The instructed phase θ_ref is generated based on, for example, the target speed of the motor 509.

A subtractor 101 calculates a deviation between the rotational phase θ of the rotor 402 of the motor 509 and the instructed phase θ_ref, and outputs the deviation to the phase controller 502.

The phase controller 502 acquires the deviation output from the subtractor 101 at a predetermined time period T (e.g., 200 μs). The phase controller 502 generates and outputs a q-axis current instructed value iq_ref and a d-axis current instructed value id_ref as target values so as to decrease the deviation output from the subtractor 101 based on proportional (P) control, integral (I) control, and differential (D) control. More specifically, the phase controller 502 generates and outputs the q-axis current instructed value iq_ref and the d-axis current instructed value id_ref so that the deviation output from the subtractor 101 becomes zero based on the P control, the I control, and the D control. In other words, the phase controller 502 functions as a first setting unit. The P control is a control method of controlling a control target value based on a value proportional to a deviation between an instructed value and an estimation value. The I control is a control method of controlling the control target value based on a value proportional to temporal integration value of the deviation between the instructed value and the estimation value. The D control is a control method of controlling the control target value based on a value proportional to time change of the deviation between the instructed value and the estimation value. While the phase controller 502 according to the present exemplary embodiment generates the q-axis current instructed value iq_ref and the d-axis current instructed value id_ref based on the PID control, it is not limited thereto. For example, the phase controller 502 may generate the q-axis current instructed value iq_ref and the d-axis current instructed value id_ref based on PI control. While the d-axis current instructed value id_ref that affects the intensity of the magnetic flux penetrating through the winding wire is set to zero in the present exemplary embodiment, it is not limited thereto.

The driving currents flowing through the winding wires in the A- and B-phases of the motor 509 are detected by a method described below by the motor driving unit 158. Current values of the driving currents detected by the motor driving unit 158 are represented as current values iα and iβ in the coordinate system at rest by the following expressions using a phase θe of the current vector illustrated in FIG. 3. The phase θe of the current vector is defined as an angle between the a-axis and the current vector. Further, I represents a magnitude of the current vector.

$$i\alpha = I^* \cos \theta e \quad (1)$$

$$i\beta = I^* \sin \theta e \quad (2)$$

These current values iα and iβ are input to the coordinate converter 511 and an induced voltage determiner 512.

The coordinate converter 511 converts the current values iα and iβ in the coordinate system at rest to a current value iq of the q-axis current and a current value id of the d-axis current in the rotational coordinate system by the following Expressions.

$$id = \cos \theta^* i\alpha + \sin \theta^* i\beta \quad (3)$$

$$iq = -\sin \theta^* i\alpha + \cos \theta^* i\beta \quad (4)$$

The q-axis current instructed value iq_ref output from the phase controller 502 and the current value iq output from the coordinate converter 511 are input to a subtractor 102. The subtractor 102 calculates a deviation between the q-axis current instructed value iq_ref and the current value iq and outputs the deviation to the current controller 503.

The d-axis current instructed value id_ref output from the phase controller 502 and the current value id output from the coordinate converter 511 are input to a subtractor 103. The subtractor 103 calculates a deviation between the d-axis current instructed value id_ref and the current value id and outputs the deviation to the current controller 503.

The current controller 503 generates driving voltages Vq and Vd so as to decrease each of the input deviations based on the PID control. More specifically, the current controller 503 generates the driving voltages Vq and Vd so that each of the input deviations becomes zero and outputs the voltages Vq and Vd to the coordinate inverter 505. While the current controller 503 according to the present exemplary embodiment generates the driving voltages Vq and Vd based on the PID control, it is not limited thereto. For example, the current controller 503 may generate the driving voltages Vq and Vd based on the PI control.

The coordinate inverter 505 inverts the driving voltages Vq and Vd in the rotational coordinate system output from the current controller 503 into driving voltages Vα and Vβ in the coordinate system at rest by the following Expressions.

$$V\alpha = \cos \theta^* Vd - \sin \theta^* Vq \quad (5)$$

$$V\beta = \sin \theta^* Vd + \cos \theta^* Vq \quad (6)$$

The coordinate inverter 505 outputs the inverted driving voltages Vα and Vβ to the induced voltage determiner 512 and a pulse width modulation (PWM) inverter 506.

The PWM inverter 506 includes a full-bridge circuit. The full-bridge circuit is driven by a PWM signal based on the driving voltages Vα and Vβ input from the coordinate inverter 505. As a result, the PWM inverter 506 generates the driving currents iα and iβ corresponding to the driving voltages Vα and Vβ, respectively, and supplies the driving currents iα and iβ to winding wires in the respective phases of the motor 509 to drive the motor 509. While the PWM inverter includes the full-bridge circuit in the present exemplary embodiment, the PWM inverter may be a half-bridge circuit or the like.

Next, a determination method of the rotational phase θ will be described. Values of induced voltages Eα and Eβ that are induced in the winding wires in the A- and B-phases of the motor 509 by the rotation of the rotor 402 are used for the determination of the rotational phase θ of the rotor 402. The values of the induced voltages are determined (calculated) by the induced voltage determiner 512. Specifically, the induced voltages Eα and Eβ are determined by the following expressions from the current values iα and iβ input from an A/D converter 510 to the induced voltage determiner 512 and the driving voltages Vα and Vβ input from the coordinate inverter 505 to the induced voltage determiner 512.

$$E\alpha = V\alpha - R^* i\alpha - L^* di\alpha/dt \quad (7)$$

$$E\beta = V\beta - R^* i\beta - L^* di\beta/dt \quad (8)$$

In the expressions, R represents a winding wire resistance, and L represents a winding wire inductance. Values of the winding wire resistance R and the winding wire inductance L (hereinafter referred to as control values) are characteristic values of the motor A as the used motor 509, and are stored in advance in the ROM 151b. The control values for the motor B are also stored in advance in the ROM 151b. The CPU 151a sets either the control values for the motor A or the control values for the motor B as the control values based on a type of the motor. The control values according to the present exemplary embodiment include, for example, a gain value obtained when a current instructed value such as the q-axis current instructed value iq_ref is determined (i.e., in the PID control).

The induced voltages Eα and Eβ determined by the induced voltage determiner 512 are output to a phase determiner 513.

The phase determiner 513 determines the rotational phase θ of the rotor 402 of the motor 509 by the following expression based on a ratio between the induced voltages Eα and Eβ output from the induced voltage determiner 512.

$$\theta = \tan^{-1}(-E\beta/E\alpha) \quad (9)$$

While the phase determiner 513 determines the rotational phase θ by performing the calculation based on the expression (9), it is not limited thereto. The phase determiner 513 may determine the rotational phase θ by referring to a table, which is stored in the ROM 151b or the like, indicating a relationship between the induced voltages Eα and Eβ and the rotational phase θ corresponding to the induced voltages Eα and Eβ.

The rotational phase θ of the rotor 402 obtained as described above is input to the subtractor 101, the coordinate inverter 505, and the coordinate converter 511.

The motor control device 600 repeatedly performs the control described above.

As described above, the motor control device 600 according to the present exemplary embodiment performs the vector control using the phase feedback control to control the current values in the rotational coordinate system so as to decrease the deviation between the instructed phase θ_ref and the rotational phase θ. Performing the vector control can prevent the motor from losing synchronization, and prevent an increase in sound of the motor and power consumption due to an excessive torque. Furthermore, performing the phase feedback control controls the rotational phase of the rotor to be a desired phase. Thus, in the image forming apparatus, applying the vector control by the phase feedback control to the motor that drives the loads (e.g., registration roller) of which the rotational phase of the rotor needs to be controlled with high accuracy enables appropriate image forming on the recording medium.

<Motor Control Unit>

As described above, in the driving control of the motor, the current value of the driving current flowing through the winding wire is detected, and the driving current flowing through the winding wire is controlled based on the detected current value. Thus, in the driving control of the motor, it is necessary to have a configuration of detecting the current value of the driving current flowing through the winding wire, and a configuration of supplying the driving current to the winding wire.

Figure 5:
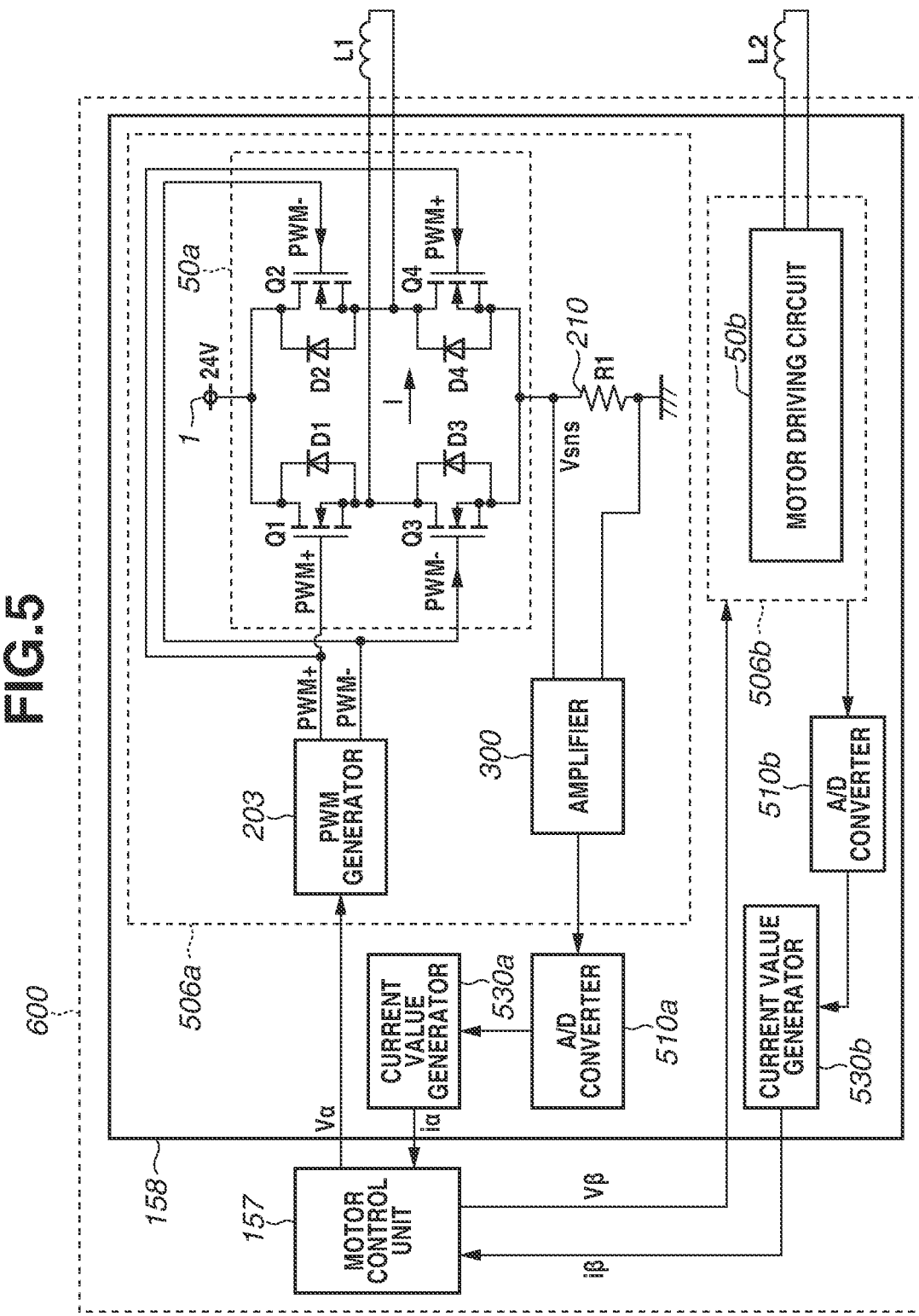
FIG. 5 is a block diagram illustrating a configuration example of a motor driving unit.

FIG. 5 is a block diagram illustrating a configuration example of the motor driving unit 158 according to the present exemplary embodiment. As illustrated in FIG. 5, the motor driving unit 158 includes a PWM inverter 506a, A/D converter 510a, and current value generator 530a for the A-phase. The motor driving unit 158 also includes a PWM inverter 506b, A/D converter 510b, and current value generator 530b for the B-phase. The PWM inverter 506 illustrated in FIG. 4 includes the PWM inverters 506a and 506b. The A/D converter 510 illustrated in FIG. 4 includes the A/D converters 510a and 510b. Furthermore, a current value generator 530 illustrated in FIG. 4 includes the current value generators 530a and 530b. In this manner, the PWM inverter, the A/D converter, and the current value generator are arranged corresponding to each of the A- and B-phases of the motor 509, and are independently driven for each phase. Since the PWM inverters 506a and 506b have the same configuration, FIG. 5 illustrates a specific configuration of the PWM inverter 506a. The PWM inverter 506a includes a motor driving circuit 50a, a PWM generator 203, and an amplifier 300. The PWM generator 203 generates a PWM signal to control an ON/OF operation of a plurality of field-effect transistors (FETs) arranged in the motor driving circuit 50a. The amplifier 300 amplifies voltage signals generated across a resistor 210.

As illustrated in FIG. 5, the motor driving circuit 50a includes FETs Q1 to Q4 as switching elements, a winding wire L1, and other elements. More specifically, the FETs Q1 to Q4 constitute an H-bridge circuit, and the winding wire L1 is connected to connect a connection point between the FETs Q1 and Q3 and a connection point between the FETs Q2 and Q4. Drain terminals of the FETs Q1 and Q2 are connected to a power source terminal of 24 V, and source terminals of the FETs Q3 and Q4 are connected to one end of the resistor 210. Furthermore, the other end of the resistor 210 is connected to the ground (GND). In other words, the resistor is grounded. In FIG. 5, the winding wire L1 is a winding wire arranged in the motor 509 in reality. In other words, the winding wire L1 is arranged outside the motor control device 600.

The FETs Q1 and Q4 are driven by PWM+, which is the PWM signal, and the FETs Q2 and Q3 are driven by PWM−, which is also the PWM signal. The PWM+ and PWM− have a mutually opposite phase relationship. More specifically, in a case where the PWM+ is at "H" (high level), the PWM− is at "L" (low level). In a case where the PWM− is at "H (high level)", the PWM+ is at "L" (low level).

In a case where the PWM+ is at "H", driving current sequentially flows from the power source to the GND through the FET Q, the winding wire L1, the FET Q4. Then, when the PWM+ reaches "L", induced electromotive force is generated in the winding wire L1 in a direction of inhibiting a change in current. As a result, the driving current sequentially flows from the GND to the power source through the FET Q3, the winding wire L1, and the FET Q2. In a case where the PWM+ is at "L", the driving current sequentially flows from the power source to the GND through the FET Q2, the winding wire L1, and the FET Q3. Then, when the PWM+ reaches "H", induced electromotive force is generated in the winding wire L1 in a direction of inhibiting a change in current. As a result, the driving current sequentially flows from the GND to the power source, through the FET Q4, the winding wire L1, and the FET Q1.

{Method of Supplying Driving Current}

First, a description will be given of a method in which the motor driving unit 158 supplies the driving current to the winding wire.

Figure 6:
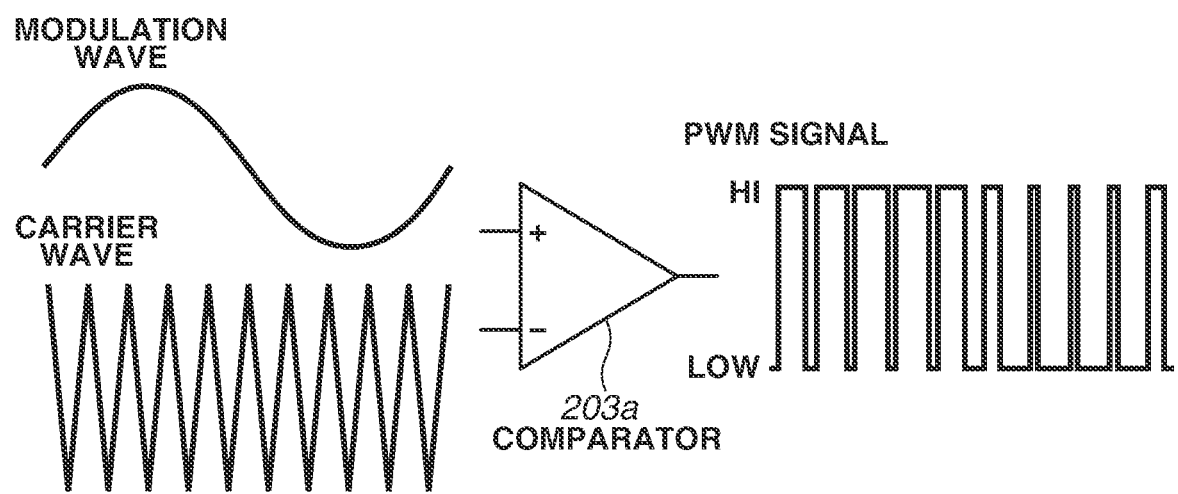
FIG. 6 is a diagram illustrating a configuration in which a pulse width modulation (PWM) generator generates a PWM signal.

FIG. 6 is a diagram illustrating a configuration for generating the PWM signal by the PWM generator 203 according to the present exemplary embodiment. As illustrated in FIG. 6, the PWM generator 203 according to the present exemplary embodiment includes a comparator 203a that compares a modulation wave and a carrier wave. The PWM generator 203 generates the PWM signal by comparing the modulation wave and the carrier wave using the comparator 203a. In the present exemplary embodiment, the PWM generator 203 generates a triangular carrier wave having a predetermined frequency. In a case where a time period from a timing at which a value of the triangular carrier wave reaches a local minimum until a timing at which the value of the triangular carrier wave reaches the local minimum next time is one period, the triangular carrier wave has such a waveform as is line-symmetric about a timing at which the value of the triangular carrier wave reaches a local maximum in one period. The triangular carrier wave for the A-phase and the triangular carrier wave for the B-phase are in synchronization with each other.

Figure 7:
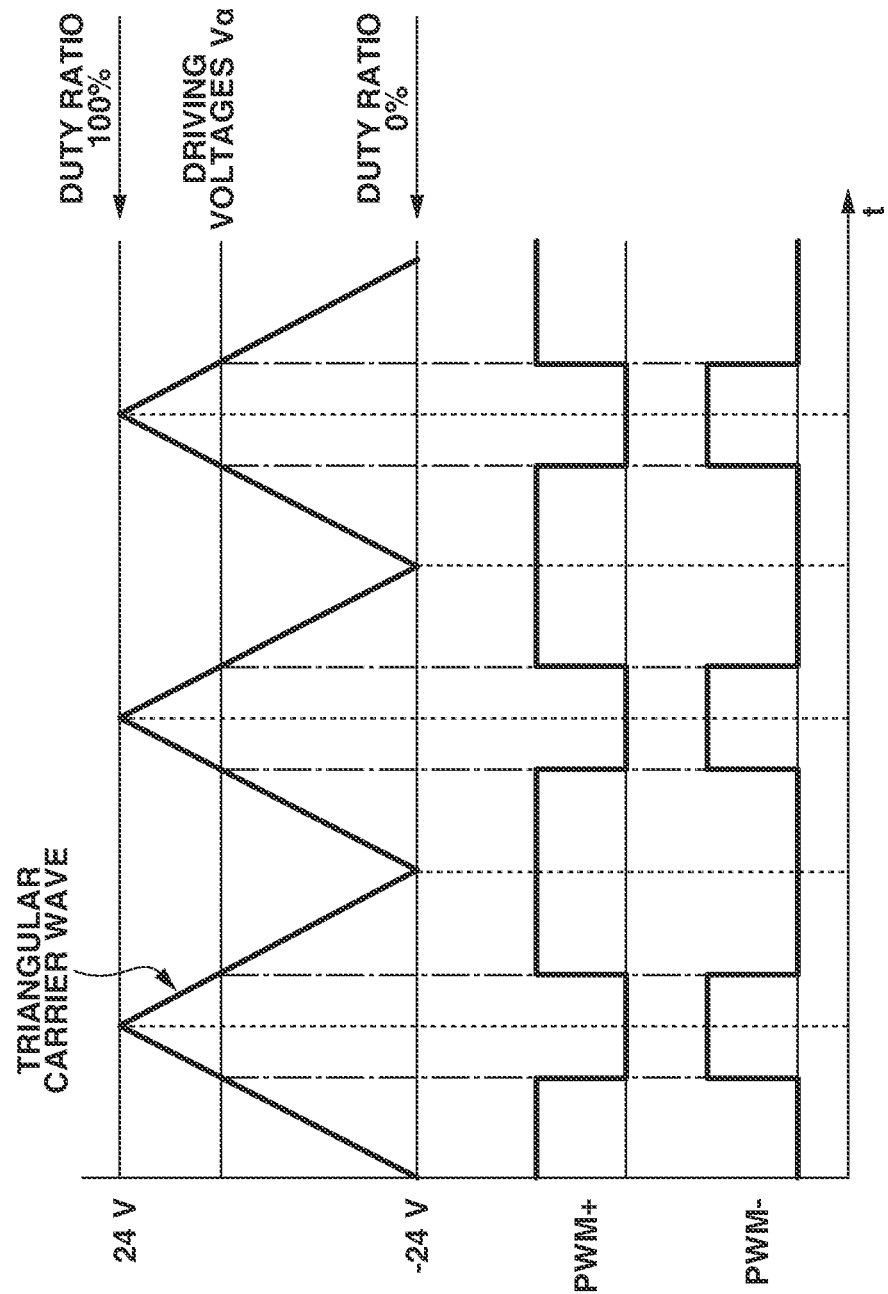
FIG. 7 is a diagram illustrating a method of generating the PWM signal by the PWM generator.

FIG. 7 is a diagram illustrating a method of generating the PWM signal by the PWM generator 203. A description will be given of a method in which the PWM generator 203 generates the PWM signal with reference to FIGS. 5 to 7.

As illustrated in FIG. 5, the driving voltage Vα output from the motor control unit 157 is input to the PWM generator 203. The PWM generator 203 compares the driving voltage Vα as the modulation wave and the triangular carrier wave using the comparator 203a, and generates the PWM+ by setting the PWM+ as "H" in a time period (high time period) in which the driving voltage Vα is higher than the triangular carrier wave, and setting the PWM+ as "L" in a time period (low time period) in which the driving voltage Vα is lower than the triangular carrier wave. The PWM generator 203 generates the PWM−, the phase of which is inverted from the phase of the PWM+.

As illustrated in FIG. 5, the PWM generator 203 outputs the PWM+ to the FETs Q1 and Q4 and the PWM− to the FETs Q2 and Q3. ON/OFF operations of the FETs Q1 to Q4 are controlled by the PWM+ and the PWM−. As a result, a magnitude and direction of the driving current supplied to the winding wire L1 for the A-phase can be controlled.

In the present exemplary embodiment, a duty ratio is 100% in a case where the driving voltage is 24 V, 50% in a case where the driving voltage is 0 V, and 0% in a case where the driving voltage is −24 V. In other words, in the present exemplary embodiment, the driving voltage Vα is a value corresponding to the duty ratio of the PWM+. While a ratio of the high time period to the period of the PWM+ is defined as the duty ratio in the present exemplary embodiment, a ratio of the low time period to the period of the PWM+ may be defined as the duty ratio.

{Current Detection Method}

Next, a description will be given of a method in which the motor driving unit 158 detects a current value of the driving current flowing through the winding wire.

As described above, the driving current flowing through the winding wire is detected based on a voltage Vsns applied across the resistor 210. The amplifier 300 amplifies a signal at the voltage Vsns and outputs the signal to the A/D converter 510a. The A/D converter 510a converts the voltage Vsns from an analog value to a digital value and outputs the digital value to the current value generator 530a.

The current value generator 530a samples the value output from the A/D converter 510a at a predetermined period, and generates a current value based on the sampled value. The current value generator 530a outputs the generated current value as a current value iα.

<Method of Discriminating Type of Motor>

Next, a description will be given of a method of discriminating a type of the motor mounted on the motor control device 600. Processing of discriminating a type of the motor described below corresponds to a first mode.

Figure 8:
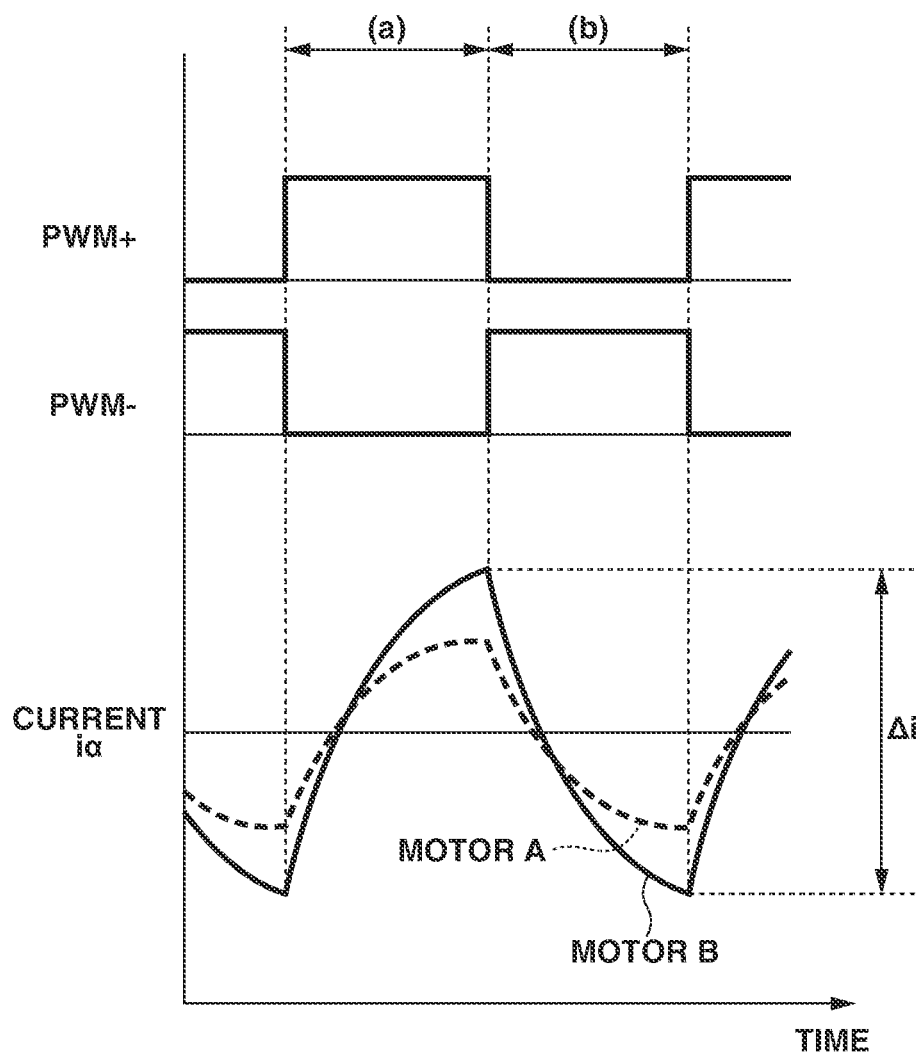
FIG. 8 is a diagram illustrating a current is in a case where a duty ratio of PWM+ is 50%.

FIG. 8 is a diagram illustrating the current iα in a case where the duty ratio of the PWM+ is 50%. As illustrated in FIG. 8, in a case where the duty ratio of the PWM+ is 50%, a maximum value and minimum value of the current iα flowing through the winding wire of the motor A are different from a maximum value and minimum value of the current iα flowing through the winding wire of the motor B, respectively. This is because a resistance value R and an inductance value L of the winding wire of the motor A are different from a resistance value R and an inductance value L of the winding wire of the motor B, respectively.

In the present exemplary embodiment, a type of the motor connected to the motor control device 600 is discriminated based on current flowing through the winding wire for the A-phase in a state where a voltage is applied to the winding wire for the A-phase based on the PWM signal with the duty ratio set to a predetermined value (e.g., 50%).

As illustrated in FIG. 4, the current values iα and iβ generated by the current value generator 530 are output to the CPU 151a. The CPU 151a discriminates a type of the motor connected to the motor control device 600 based on a local maximum (maximum value) of the current value iα in a time period from a timing at which the current value is reaches the local minimum for the first time after the current value iα is input until a timing at which the current value iα reaches the local minimum next time. More specifically, the CPU 151a discriminates, if the local maximum of the current value iα in the time period is a threshold ith or more, that the motor connected to the motor control device 600 is the motor B, and sets a control value to a value corresponding to the motor B. The CPU 151a discriminates, if the local maximum of the current value iα in the time period is less than the threshold ith, that the motor connected to the motor control device 600 is the motor A, and sets a control value to a value corresponding to the motor A. In other words, the CPU 151a functions as a determination means and a second setting means. The threshold ith is set to a value more than the local maximum of the current flowing through the winding wire of the motor A in a state where the voltage is applied to the winding wire based on the PWM signal with the duty ratio set to the predetermined value. Furthermore, the threshold ith is set to a value less than the local maximum of the current flowing through the winding wire of the motor B in a state where the voltage is applied to the winding wire based on the PWM signal with the duty ratio set to the predetermined value. In other words, the local maximum of the current value iα being less than the threshold ith means that the motor connected to the motor control device 600 is the motor A. The local maximum of the current value iα being more than the threshold ith means that the motor connected to the motor control device 600 is the motor B.

Figure 9:
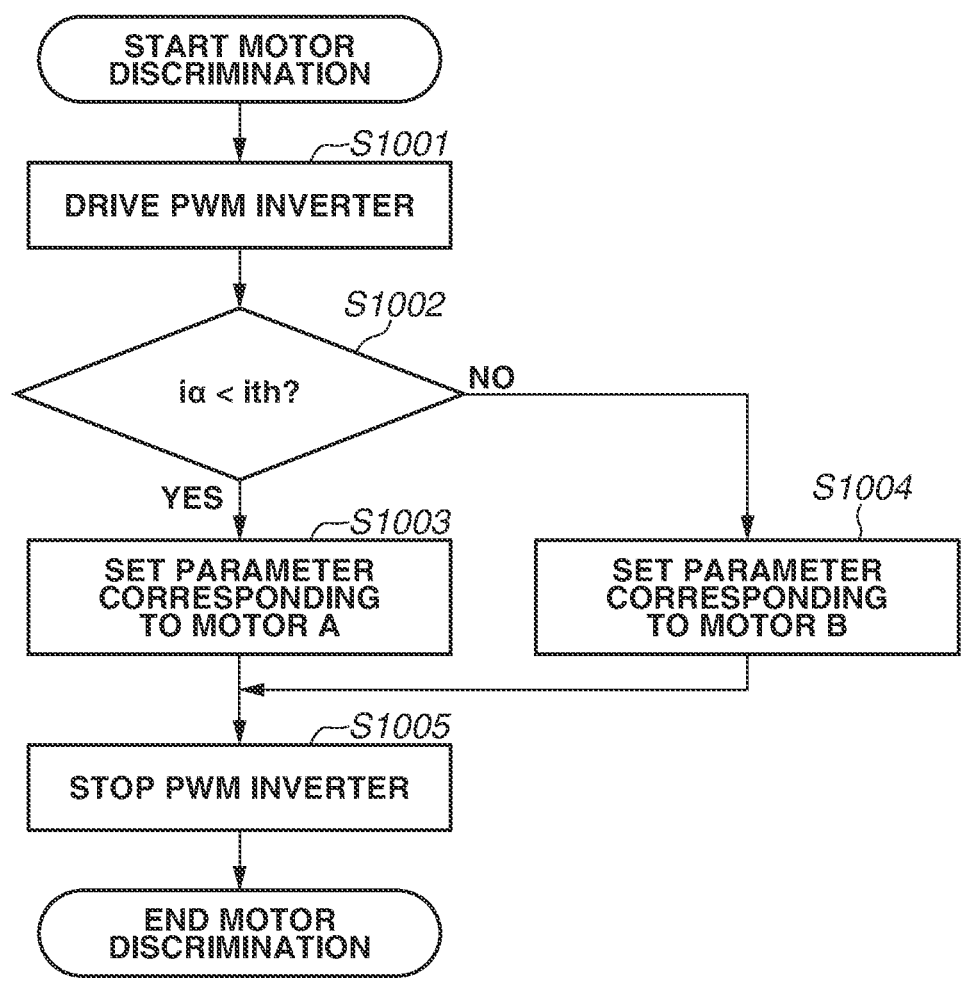
FIG. 9 is a flowchart illustrating a method of discriminating a type of a motor.

FIG. 9 is a flowchart illustrating a method of discriminating a type of the motor. Processing in this flowchart is executed by the CPU 151a.

In step S1001, the CPU 151a drives the PWM inverter 506 (motor driving unit 158). More specifically, the CPU 151a sets the duty ratio of the PWM+ to a predetermined value, and applies a voltage to the winding wire of the motor 509.

In step S1002, if the current value iα is less than the threshold ith (YES in step S1002), the processing proceeds to step S1003. In step S1003, the CPU 151a determines that the motor connected to the motor control device 600 is the motor A, and sets a control value in the motor control device 600 to a control value corresponding to the motor A.

On the other hand, in step S1002, if the current value iα is the threshold ith or more (NO in step S1002), the processing proceeds to step S1004. In step S1004, the CPU 151a determines that the motor connected to the motor control device 600 is the motor B, and sets a control value in the motor control device 600 to a control value corresponding to the motor B.

In step S1005, the CPU 151a stops driving the PWM inverter 506 (motor driving unit 158), and ends the processing in this flowchart.

<Timing of Discriminating Type of Motor>

Next, a description will be given of a timing of discriminating a type of the motor.

Figure 10:
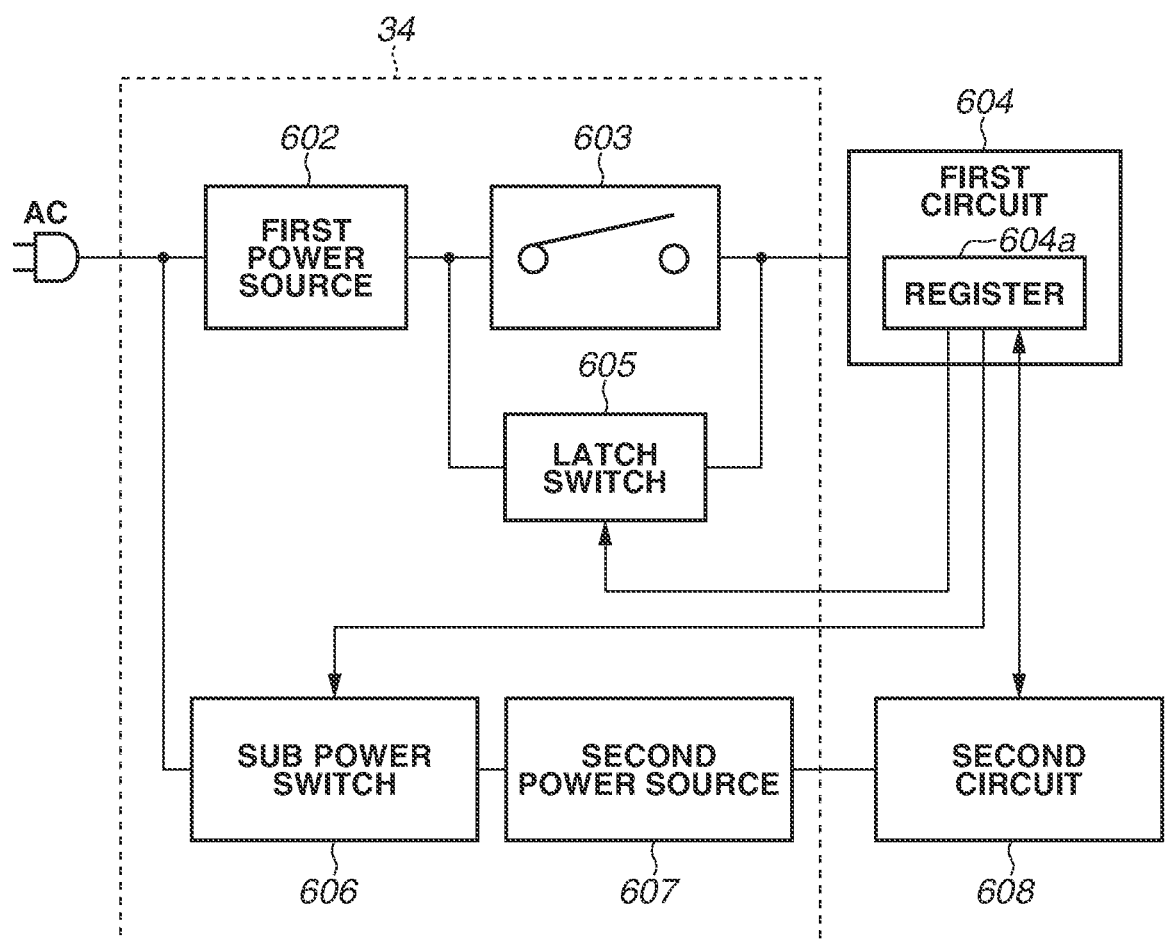
FIG. 10 is a block diagram illustrating a configuration of a power source according to the first exemplary embodiment.

FIG. 10 is a block diagram illustrating a configuration of the power source 34 according to the present exemplary embodiment. As illustrated in FIG. 10, the power source 34 includes a first power source 602 to which power is supplied from the commercial power source AC, and a main power switch 603 operated by the user. The power source 34 also includes a latch switch 605, an ON/OFF state of which is controlled by a first circuit 604 composed of a switching element such as an FET. The power source 34 further includes a sub power switch 606 and a second power source 607. An ON/OFF state of the sub power switch 606 is controlled by the first circuit 604 composed of the switching element such as an FET. Power is supplied to the second power source 607 from the commercial power source AC through the sub power switch 606. The latch switch 605 may be composed of a relay circuit. The sub power switch 606 may also be composed of a relay circuit.

The first circuit 604 is a circuit that controls a state of power supply to various devices in the image forming apparatus 100, and is composed of, for example, a complex programmable logic device (CPLD). The CPU 151a is included in the first circuit 604. The motor control device 600 is included in a second circuit 608.

When the main power switch 603 is switched from the ON state to the OFF state by the user, a path for supplying power from the first power source 602 to the first circuit 604 is interrupted. When the main power switch 603 is switched from the ON state to the OFF state by the user, the first circuit 604 brings the sub power switch 606 into the OFF state. As a result, power supply from the commercial power source AC to the second power source 607 is interrupted. When the main power switch 603 is switched from the ON state to the OFF state by the user, the first circuit 604 brings the second circuit 608 into the OFF state. Thereafter, the first circuit 604 brings the latch switch 605 into the OFF state, and then brings the first circuit 604 itself into the OFF state.

In this manner, when the main power switch 603 is switched from the ON state to the OFF state by the user, power supply from the commercial power source AC to the circuits other than the first power source 602 stops.

{Normal Power Mode}

A description will be given of a normal power mode as a power mode in a state where the main power switch 603 is in the ON state. When the main power switch 603 is switched from the OFF state to the ON state by the user, the first circuit 604 sets the power mode of the image forming apparatus 100 to the normal power mode.

When the main power switch 603 is switched from the OFF state to the ON state by the user, power supply from the first power source 602 to the first circuit 604 starts, which activates the first circuit 604. The first circuit 604 brings the latch switch 605 into the ON state and then latches a power supply state of the first circuit 604 itself. As a result, even if the main power switch 603 is switched from the ON state to the OFF state by the user, the power supply from the first power source 602 to the first circuit 604 is maintained through the latch switch 605. When the main power switch 603 is switched from the OFF state to the ON state by the user, the first circuit 604 performs, for example, an initial operation such as writing of data stored in the ROM 151b to the register 604a. Furthermore, the first circuit 604 brings the sub power switch 606 into the ON state. As a result, power is supplied from the second power source 607 to the second circuit 608. In this way, power is supplied to the motor control device 600 (motor driving circuit) in the normal power mode.

{Sleep Mode}

Next, a description will be given of a sleep (power saving) mode as a power mode in which the main power switch 603 is in the ON state. The sleep mode is a power mode in which a power consumption is smaller than that in the normal power mode.

When a power saving button arranged on the operation unit 152 is pressed by the user in the normal power mode, the first circuit 604 switches the power mode from the normal power mode to the sleep mode. When a state of the display unit arranged on the operation unit 152 being not operated continues for a predetermined time period in the normal power mode, the first circuit 604 switches the power mode from the normal power mode to the sleep mode. Furthermore, when a state of the communication I/F 162 not receiving an image forming job continues for a predetermined time period in the normal power mode, the first circuit 604 switches the power mode from the normal power mode to the sleep mode.

In the sleep mode, the first circuit 604 interrupts, for example, power supply to the second circuit 608. As a result, power is not supplied to the motor control device 600 (motor driving circuit) in the sleep mode, but is supplied to the first circuit 604.

If the power saving button arranged on the operation unit 152 is pressed by the user in the sleep mode, the first circuit 604 switches the power mode from the sleep mode to the normal power mode. When the display unit arranged on the operation unit 152 is operated by the user in the sleep mode, the first circuit 604 switches the power mode from the sleep mode to the normal power mode. Furthermore, when the communication I/F 162 receives an image forming job in the sleep mode, the first circuit 604 switches the power mode from the sleep mode to the normal power mode. When the power mode is switched from the sleep mode to the normal power mode, power supply to the devices including the motor control device 600 starts.

{Start-Up Flag}

As illustrated in FIG. 10, the first circuit 604 includes a register 604a. If the power mode shifts to the normal power mode caused by the main power switch 603 being switched from the OFF state to the ON state, the first circuit 604 sets a start-up flag to "0" and then writes the value in the register 604a. On the other hand, when the power mode shifts from the sleep mode to the normal power mode, the first circuit 604 sets the start-up flag to "1" and then writes the value in the register 604a.

The motor is replaced in a state where power is not supplied to the motor driving circuit. In other words, the motor is not replaced in a state where power is supplied to the motor driving circuit as is in the sleep mode.

Thus, in the present exemplary embodiment, if the power mode shifts to the normal power mode, the CPU 151a checks the start-up flag written in the register 604a. In a case where the start-up flag is "0", the CPU 151a executes the processing to discriminate a type of the motor described above. More specifically, the CPU 151a executes the processing to discriminate a type of the motor before the start of an image forming job for the first time after the power mode shifts to the normal power mode caused by the main power switch 603 being switched from the OFF state to the ON state. In a case where the start-up flag is "1", the CPU 151a does not execute the processing to discriminate a type of the motor.

As described above, in the present exemplary embodiment, the CPU 151a executes the processing to discriminate a type of the motor when there is a possibility that the motor has been replaced. More specifically, if a state where the first circuit 604 and the non-first circuit 608 are not supplied with power shifts to a state where the first circuit 604 and the second circuit 608 are supplied with power, the CPU 151a executes the processing to discriminate a type of the motor. Even if a state where the first circuit 604 is supplied with power and the second circuit 608 is not supplied with power shifts to a state where the first circuit 604 and the second circuit 608 are supplied with power, the CPU 151a does not execute the processing to discriminate a type of the motor. This allows the image forming apparatus that discriminates a type of the motor connected to the driving circuit to prevent elongation of time required until the image forming apparatus becomes operable after power is supplied to the driving circuit.

A second exemplary embodiment will be described. A description of a part having a configuration similar to that of the first exemplary embodiment will be omitted.

In the first exemplary embodiment, the description has been given of the configuration in which the motor 509 drives the loads arranged in the image printing apparatus 301. In the present exemplary embodiment, the motor 509 drives loads such as the pickup roller 3, the feeding roller 4, and the conveyance roller 6 that are arranged in the document feeding device 201.

The power mode in the document feeding device 201 is switched from the normal power mode to the sleep mode, for example, in following cases. Specifically, if the power saving button arranged on the operation unit 152 is pressed by the user in the normal power mode, the first circuit 604 switches the power mode from the normal power mode to the sleep mode. If a state of the display unit arranged on the operation unit 152 being not operated continues for a predetermined time period in the normal power mode, the first circuit 604 switches the power mode from the normal power mode to the sleep mode. Furthermore, if a state of the communication I/F 162 not receiving an image forming job continues for a predetermined time period in the normal power mode, the first circuit 604 switches the power mode from the normal power mode to the sleep mode.

The power mode in the document feeding device 201 is switched from the sleep mode to the normal power mode in following cases. Specifically, if the power saving button arranged on the operation unit 152 is pressed by the user in the sleep mode, the first circuit 604 switches the power mode from the sleep mode to the normal power mode. If the sheet sensor SS1 detects that a document has been loaded on the document loading unit 2 in the sleep mode, the first circuit 604 switches the power mode from the sleep mode to the normal power mode. Furthermore, if the angle detection sensor SS2 detects that the opening/closing angle of the document feeding device 201 with respect to the reading device 202 is the predetermined angle or larger in the sleep mode, the first circuit 604 switches the power mode from the sleep mode to the normal power mode. Furthermore, if a human detection sensor, which detects the presence of the user within a predetermined range from the image forming apparatus 100, detects the user in the sleep mode, the first circuit 604 switches the power mode from the sleep mode to the normal power mode.

If the power mode shifts to the normal power mode, the CPU 151a checks the start-up flag written in the register 604a. In a case where the start-up flag is "0", the CPU 151a executes the processing to discriminate a type of the motor described above. More specifically, the CPU 151a executes the processing to discriminate a type of the motor before the start of conveyance of the document for the first time after the power mode shifts to the normal power mode caused by the main power switch 603 being switched from the OFF state to the ON state. In a case where the start-up flag is "1", the CPU 151a does not execute the processing to discriminate a type of the motor.

As described above, in the present exemplary embodiment, the CPU 151a executes the processing to discriminate a type of the motor when there is a possibility that the motor has been replaced. More specifically, if a state where the first circuit 604 and the second circuit 608 are not supplied with power shifts to a state where the first circuit 604 and the second circuit 608 are supplied with power, the CPU 151a executes the processing to discriminate a type of the motor. Even if a state where the first circuit 604 is supplied with power and the second circuit 608 is not supplied with power shifts to a state where the first circuit 604 and the second circuit 608 are supplied with power, the CPU 151a does not execute the processing to discriminate a type of the motor. This allows the image forming apparatus that discriminates a type of the motor connected to the driving circuit to prevent elongation of time required until the image forming apparatus becomes operable after power is supplied to the driving circuit.

A description of a part having a configuration similar to that of the first exemplary embodiment will be omitted.

In the present exemplary embodiment, the processing to discriminate a type of the motor is executed in a case where a plug for the commercial power source AC is plugged in or plugged out.

Figure 11:
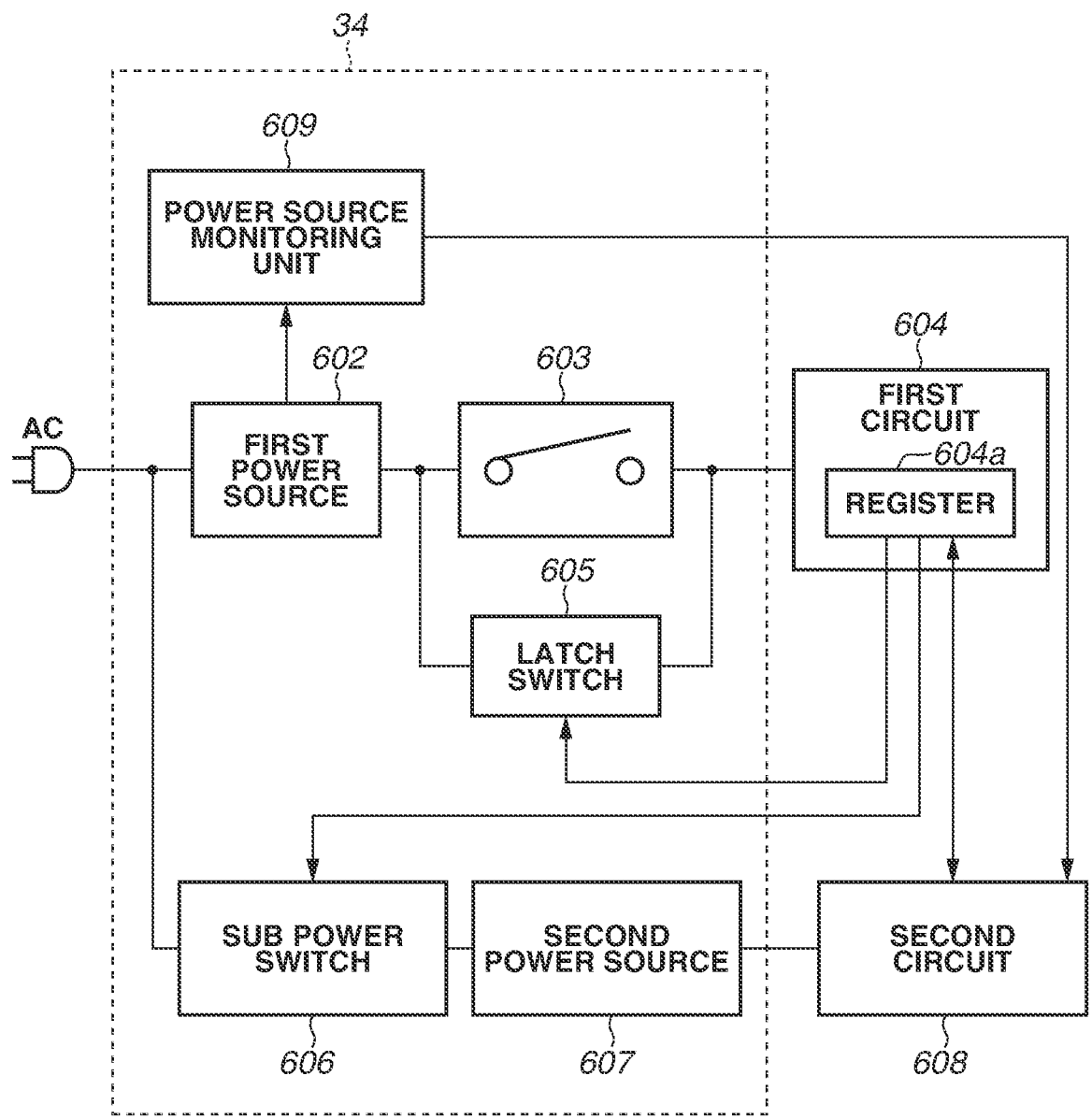
FIG. 11 is a block diagram illustrating a configuration of a power source according to a third exemplary embodiment.

FIG. 11 is a block diagram illustrating a configuration of a power source 34 according to the present exemplary embodiment. As illustrated in FIG. 11, the power source 34 in the present exemplary embodiment includes a power source monitoring unit 609 that detects a voltage applied from the commercial power source AC to the first power source 602. The power source monitoring unit 609 may operate with power supplied from the first power source 602. Alternatively, the power source monitoring unit 609 may include a battery and operate with power of the battery.

{Plug-in/Plug-Out Flag}

If the plug for the commercial power source AC is plugged out, the voltage applied to the first power source 602 decreases. If a value of the voltage applied to the first power source 602 becomes a predetermined value or less, the power source monitoring unit 609 rewrites a plug-in/plug-out flag from "0" to "1". Thus, the plug-in/plug-out flag being "1" means that the plug for the commercial power source AC is plugged out.

In the present exemplary embodiment, the motor is replaced in a state where power is not supplied to the devices in the image forming apparatus 100 (the main power switch 603 is in OFF state) and the plug for the commercial power source AC is plugged out. Thus, in the present exemplary embodiment, if power supply to the CPU 151a starts, the CPU 151a checks the plug-in/plug-out flag written in the register 604a. In a case where the plug-in/plug-out flag is "1" (the plug for the commercial power source AC is plugged out), the CPU 151a executes the processing to discriminate a type of the motor described above. In a case where the plug-in/plug-out flag is "0" (the plug for the commercial power source AC is not plugged out), the CPU 151a does not execute the processing to discriminate a type of the motor.

As described above, in the present exemplary embodiment, the CPU 151a executes the processing to discriminate a type of the motor when there is a possibility that the motor has been replaced. This can prevent the determination of a type of the motor from being executed every time the main power switch 603 is switched from the OFF state to the ON state. As a result, the configuration allows the image forming apparatus that discriminates a type of the motor connected to the driving circuit to prevent elongation of time required until the image forming apparatus becomes operable after power is supplied to the driving circuit. Upon completion of the checking of the plug-in/plug-out flag, the first circuit 604 sets the plug-in/plug-out flag written in the register 604a to "0".

A fourth exemplary embodiment will be described. A description of a part having a configuration similar to that of the first exemplary embodiment will be omitted.

In the present exemplary embodiment, the processing to discriminate a type of the motor is executed in a case where the plug for the commercial power source AC is plugged in or plugged out.

{Power Source OFF Flag}

In the present exemplary embodiment, if the main power switch 603 is switched from the ON state to the OFF state by the user, the path for supplying power from the first power source 602 to the first circuit 604 is interrupted. If the main power switch 603 is switched from the ON state to the OFF state by the user, the first circuit 604 brings the sub power switch 606 into the OFF state. As a result, power supply from the commercial power source AC to the second power source 607 is interrupted. If the main power switch 603 is switched from the ON state to the OFF state by the user, the first circuit 604 brings the second circuit 608 into the OFF state. Thereafter, the first circuit 604 brings the latch switch 605 into the OFF state after changing a power source OFF flag from "0" to "1", and then brings the first circuit 604 itself into the OFF state.

On the other hand, if the plug for the commercial power source AC is plugged out with the main power switch 603 being in the ON state, power supply to the first power source 602 is interrupted without the first circuit 604 switching the power source OFF flag from "0" to "1". Thus, if the plug for the commercial power source AC is plugged out with the main power switch 603 being in the ON state, the power source OFF flag is "0" when the plug for the commercial power source AC is connected to the commercial power source AC and the power supply to the first circuit 604 starts. Accordingly, the power source OFF flag being "0" means that the plug for the commercial power source AC is plugged out.

In the present exemplary embodiment, the motor is replaced in a state where power is not supplied to the devices in the image forming apparatus 100 (the main power switch 603 is in the OFF state) and the plug for the commercial power source AC is plugged out. Thus, in the present exemplary embodiment, if power supply to the CPU 151a starts, the CPU 151a checks the power source OFF flag written in the register 604a. In a case where the power source OFF flag is "0" (the plug for the commercial power source AC is plugged out), the CPU 151a executes the processing to discriminate a type of the motor described above. When the power source OFF flag is "1" (the plug for the commercial power source AC is not plugged out), the CPU 151a does not execute the processing to discriminate a type of the motor.

As described above, in the present exemplary embodiment, the CPU 151a executes the processing to discriminate a type of the motor when there is a possibility that the motor has been replaced. This can prevent the determination of a type of the motor from being executed every time the main power switch 603 is switched from the OFF state to the ON state. As a result, the configuration allows the image forming apparatus that discriminates a type of the motor connected to the driving circuit to prevent elongation of time required until the image forming apparatus becomes operable after power is supplied to the driving circuit. If the CPU 151a checks the power source OFF flag, the first power source 602 sets the power source OFF flat to "0".

A fifth exemplary embodiment will be described. A description of a part having a configuration similar to that of the first exemplary embodiment will be omitted.

In the first exemplary embodiment, if the main power switch 603 is switched from the ON state to the OFF state by the user, the first circuit 604 brings the latch switch 605 into the OFF state and brings the first circuit 604 itself into the OFF state. If the main power switch 603 is switched from the OFF state to the ON state by the user, the first circuit 604 performs the initial operation such as writing of data stored in the ROM 151b to the register 604a.

In the present exemplary embodiment, the latch switch 605 is maintained in the ON state even if the main power switch 603 is switched from the ON state to the OFF state by the user. In this way, power is supplied to the first circuit 604 even if the main power switch 603 is switched from the ON state to the OFF state by the user. As a result, when the main power switch 603 is switched from the OFF state to the ON state by the user, the first circuit 604 does not need to perform the initial operation and thus can start the image forming apparatus 100 more quickly. In the following description, an operation of the first circuit 604 to start the image forming apparatus 100 without performing the initial operation is referred to as quick start-up.

If the main power switch 603 is switched from the OFF state to the ON state without the plug for the commercial power source AC being plugged out after the main power switch 603 is switched from the ON state to the OFF state, the first circuit 604 can perform the quick start-up. On the other hand, if the plug for the commercial power source AC is plugged out after the main power switch 603 is switched from the ON state to the OFF state, the power supply to the first circuit 604 is interrupted. As a result, if the main power switch 603 is switched from the ON state to the OFF state after the plug for the commercial power source AC is connected to the commercial power source AC, the first circuit 604 needs to perform the initial operation. Thus, if the plug for the commercial power source AC is plugged out after the main power switch 603 is switched from the ON state to the OFF state, the first circuit 604 cannot perform the quick start-up.

In the present exemplary embodiment, the motor is replaced in a state where power is not supplied to the devices in the image forming apparatus 100 (the main power switch 603 is in the OFF state) and the plug for the commercial power source AC is plugged out. Thus, in the present exemplary embodiment, the CPU 151a determines whether to execute the processing to discriminate a type of the motor based on whether the first circuit 604 has performed the quick start-up. More specifically, in a case where the first circuit 604 has performed the quick start-up, the CPU 151a executes the processing to discriminate a type of the motor described above. In a case where the first circuit 604 has been unable to perform the quick start-up, the CPU 151a does not execute the processing to discriminate a type of the motor described above.

As described above, in the present exemplary embodiment, the CPU 151a executes the processing to discriminate a type of the motor when there is a possibility that the motor has been replaced. This can prevent the determination of a type of the motor from being executed every time the main power switch 603 is switched from the OFF state to the ON state. As a result, the configuration allows the image forming apparatus that discriminates a type of the motor connected to the driving circuit to prevent elongation of time required until the image forming apparatus becomes operable after power is supplied to the driving circuit.

While a type of the motor is discriminated by the method illustrated in FIG. 8 in the first to fifth exemplary embodiments, it is not limited thereto. For example, a type of the motor may be discriminated by reading a barcode arranged on the motor. Alternatively, a type of the motor may be discriminated by measuring the resistance value R and inductance value L of the winding wire of the motor.

While the CPU 151a discriminates a type of the motor in the first to fifth exemplary embodiments, a configuration is not limited thereto. For example, a determination unit as a constituent element to determine a type of the motor may be arranged separately from the CPU 151a.

While the CPU 151a sets the control value in the first to fifth exemplary embodiments, it is not limited thereto. For example, a setting unit as a constituent element to set the control value may be arranged separately from the CPU 151a.

Figure 12:
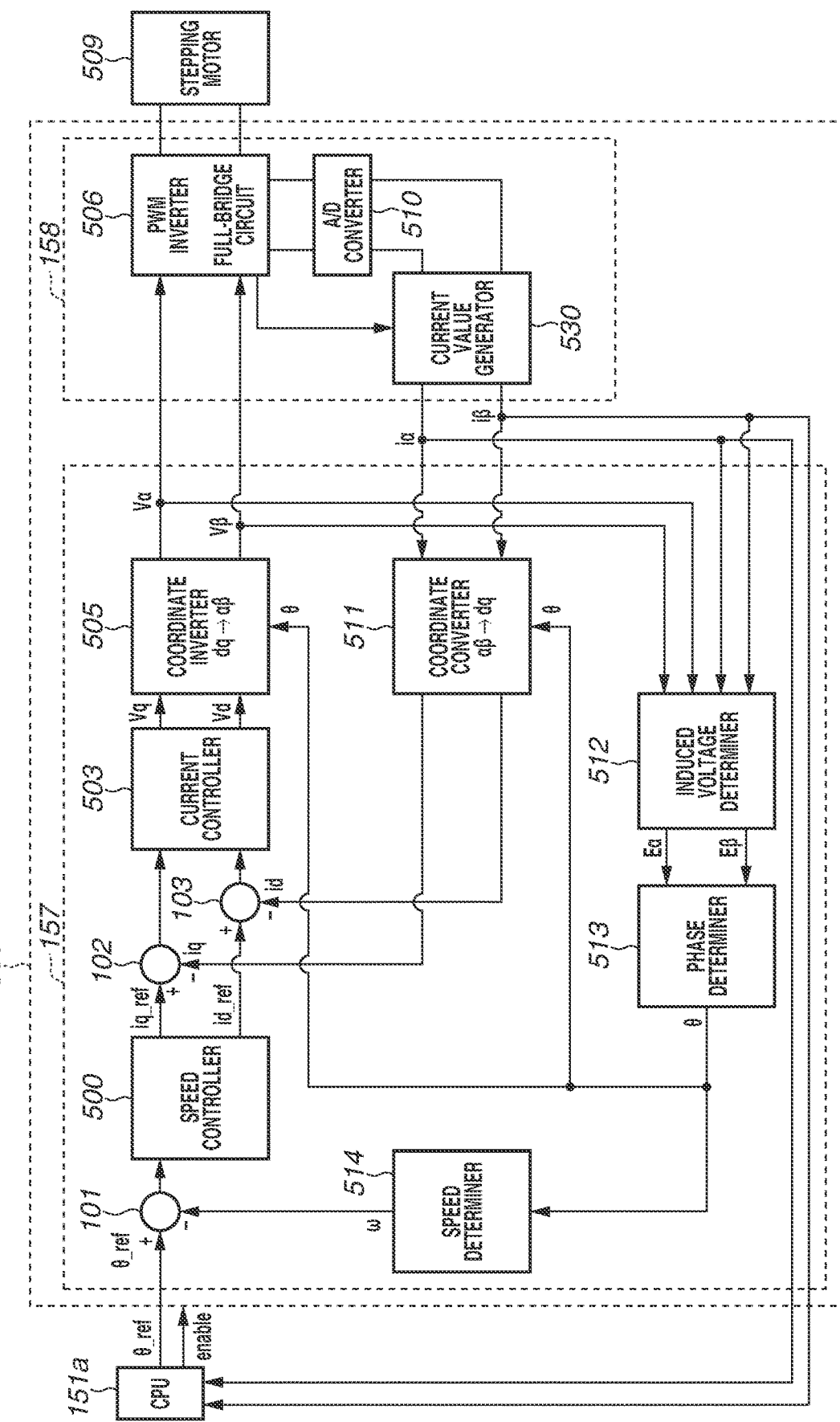
FIG. 12 is a block diagram illustrating a configuration of a motor control device that performs speed feedback control.

While in the vector control according to the first to fifth exemplary embodiments, the motor 509 is controlled by performing the phase feedback control, it is not limited thereto. For example, the motor 509 may be controlled by feeding back a rotational speed ω of the rotor 402. More specifically, as illustrated in FIG. 12, a speed controller 500 is arranged in the motor control device 600 and the CPU 151a outputs an instructed speed ω_ref representing a target speed of the rotor. Furthermore, a speed determiner 514, which is arranged in the motor control device 600, determines the rotational speed ω based on a time change of the rotational phase θ output from the phase determiner 513. The speed controller 500 is configured to generate and output the q-axis current instructed value iq_ref and the d-axis current instructed value id_ref so that a deviation between the rotational speed ω and the instructed speed ω_ref. The motor 509 may be controlled by performing such speed feedback control in this way. Since the rotational speed is fed back in such a configuration, the rotation speed of the rotor can be controlled to be a predetermined speed. Thus, in the image forming apparatus, vector control using the speed feedback control is applied to the motor that drives each load (e.g., the photoconductive drum and the conveying belt), the rotational speed of which needs to be controlled to be a predetermined speed for appropriate image forming on the recording medium. As a result, the image forming on the recording medium can be appropriately performed.

While the stepping motor is used as a motor to drive loads in the first to fifth exemplary embodiments, the motor may be another motor such as a direct-current (DC) motor. The motor is not limited to the two-phase motor, and may be another motor such as a three-phase motor.

While the permanent magnet is used as the rotor in the first to fifth exemplary embodiments, it is not limited thereto.

The photoconductive drum 309, the developing device 314, and the fixing unit 318 are included in the image forming unit.

The present disclosure allows the image forming apparatus that discriminates a type of the motor connected to the driving circuit to prevent elongation of time required until the image forming apparatus becomes operable after power is supplied to the driving circuit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2019-198006, filed Oct. 30, 2019, and No. 2020-131915, filed Aug. 3, 2020, which are hereby incorporated by reference herein in their entirety.

What is claimed is:

1. An image forming apparatus including an image forming unit configured to form an image on a recording medium, the image forming apparatus comprising:
   a power source to be connected to an external power source and configured to be supplied with power from the external power source;
   a motor configured to drive a load;
   a driving circuital to which a winding of the motor is connected, the driving circuit being configured to supply driving current to the winding based on power supplied from the power source;
   a first switching element configured to be switched between a first state in which the power is supplied from the power source to the driving circuit and a second state in which the power is not supplied from the power source to the driving circuit;
   a first controller configured to operate with power supplied from the power source and configured to switch a state of the first switching element between the first state and the second state;
   a second switching element configured to be switched between a third state in which the power is supplied from the power source to the first controller through the second switching element and a fourth state in which the power is not supplied from the power source to the first controller through the second switching element;
   a detector configured to detect driving current flowing through the winding; and
   a second controller configured to control the driving circuit,
   wherein the image forming apparatus includes a first power mode, as a power mode, in which the power is supplied from the power source to both the first controller and the driving circuit, and includes a second power mode, as the power mode, in which the power is supplied from the power source to the first controller and is not supplied from the power source to the driving circuit, the first controller switching the state of the first switching element from the second state to the first state in a case where the power mode is switched from the second power mode to the first power mode,
   wherein the second controller is configured to:
      set a control value corresponding to a type of the motor connected to the driving circuit based on the driving current detected by the detector;
      determine a rotational phase of a rotor of the motor based on the driving current detected by the detector and the set control value; and
      set a target value of current to be supplied to the winding so as to decrease a deviation between the determined rotational phase and an instructed phase representing a target phase of the rotor of the motor,
   wherein the second controller includes a first mode in which the second controller controls the driving circuit so that the driving circuit supplies predetermined current to the winding to set the control value, and a second mode in which the second controller controls the driving circuit so that the driving circuit supplies driving current corresponding to the set target value to the winding,
   wherein the second controller is configured to set the control value based on the driving current detected by the detector in the first mode, wherein the second controller is configured to execute the first mode, in a case where the power is supplied from the power source to the first controller caused by switching of the second switching element from the fourth state to the third state and the first controller switches the state of the first switching element from the second state to the first state in response to the power being supplied to the first controller, and wherein the second controller is configured not to execute the first mode even if the first controller switches the state of the first switching element from the second state to the first state in response to the power mode being switched from the second power mode to the first power mode, in a case where the power mode is switched from the second power mode to the first power mode.

2. The image forming apparatus according to claim 1, wherein the second switching element is configured to be operated by a user, the second switching element connecting the power source and the first controller.

3. The image forming apparatus according to claim 1, wherein the second controller is configured to set, as the target value, a target value of a torque current component that is a current component represented in a rotational coordinate system based on the determined rotational phase and that produces a torque in the rotor so as to decrease the deviation between the determined rotational phase and the instructed phase.

4. The image forming apparatus according to claim 1, wherein the second controller is configured to discriminate a type of the motor connected to the driving circuit based on the driving current detected by the detector in the first mode, and wherein the second controller is configured to set the control value corresponding to the discriminated type of the motor.

5. The image forming apparatus according to claim 1, wherein the control value includes a value corresponding to resistance of the winding.

6. The image forming apparatus according to claim 1, further comprising:
a document conveyance unit including a stacking unit on which a document is stacked, and a conveyance unit configured to convey the document stacked on the stacking unit; and
a reading unit including a transparent member, and a reading portion configured to read an image on a document placed on the transparent member and read an image on a document conveyed by the conveyance unit,
wherein the document conveyance unit is configured to be rotatable with respect to the reading unit, and
wherein the motor is configured to drive a load in the document conveyance unit.

7. An image forming apparatus including an image forming unit configured to form an image on a recording medium, the image forming apparatus comprising:
a power source connected to an external power source and configured to be supplied with power from the external power source;
a motor configured to drive a load;
a driving circuit, to which a winding of the motor is connected, and the driving circuit being configured to supply driving current to the winding based on power supplied from the power source;
a first switching element configured to be switched between a first state in which the power is supplied from the power source to the driving circuit and a second state in which the power is not supplied from the power source to the driving circuit;
a first controller configured to operate with power supplied from the power source and configured to switch a state of the first switching element between the first state and the second state;
a second switching element configured to be switched between a third state in which the power is supplied from the power source to the first controller through the second switching element and a fourth state in which the power is not supplied from the power source to the first controller through the second switching element;
a detector configured to detect driving current flowing through the winding; and
a second controller configured to control the driving circuit,
wherein the image forming apparatus includes a first power mode, as a power mode, in which the power is supplied from the power source to both the first controller and the driving circuit, and includes a second power mode, as the power mode, in which the power is supplied from the power source to the first controller and is not supplied from the power source to the driving circuit, the first controller switching the state of the first switching element from the second power mode to the first power mode,
wherein the second controller is configured to:
set a control value corresponding to a type of the motor connected to the driving circuit based on the driving current detected by the detector;
determine a rotational speed of a rotor of the motor based on the driving current detected by the detector and the set control value; and
set a target value of current to be supplied to the winding so as to decrease a deviation between the determined rotational speed and an instructed speed representing a target speed of the rotor of the motor,
wherein the second controller includes a first mode in which the second controller controls the driving circuit so that the driving circuit supplies predetermined current to the winding to set the control value, and a second mode in which the second controller controls the driving circuit so that the driving circuit supplies driving current corresponding to the set target value to the winding,
wherein the second controller is configured to set the control value based on the driving current detected by the detector in the first mode,
wherein the second controller is configured to execute the first mode, in a case where the power is supplied from the power source to the first controller caused by switching of the second switching element from the fourth state to the third state and the first controller switches the state of the first switching element from the second state to the first state in response to the power being supplied to the first controller, and
wherein the second controller is configured not to execute the first mode even if the first controller switches the state of the first switching element from the second state to the first state in response to the power mode being switched from the second power mode to the first power mode, in a case where the power mode is switched from the second power mode to the first power mode.

8. The image forming apparatus according to claim 7, wherein the second switching element is configured to be operated by a user, the second switching element connecting the power source and the first controller.

9. The image forming apparatus according to claim 7, wherein the second controller is configured to determine a rotational phase of the rotor,
wherein the second controller is configured to set, as the target value, a target value of a torque current component that is a current component represented in a rotational coordinate system based on the determined rotational speed and that produces a torque in the rotor so as to decrease the deviation between the determined rotational speed and the instructed speed.

10. The image forming apparatus according to claim 7, wherein the control value includes a value corresponding to resistance of the winding.

11. The image forming apparatus according to claim 7, wherein the load is a conveyance roller configured to convey the recording medium.

12. The image forming apparatus according to claim 7, further comprising:
a document conveyance unit including a stacking unit on which a document is stacked, and a conveyance unit configured to convey the document stacked on the stacking unit; and
a reading unit including a transparent member, and a reading portion configured to read an image on a document loaded on the transparent member and read an image on a document conveyed by the conveyance unit,
wherein the document conveyance unit is configured to be rotatable with respect to the reading unit, and
wherein the motor is configured to drive a load in the document conveyance unit.

13. The image forming apparatus according to claim 12, wherein the load is a conveyance roller as the conveyance unit.

14. The image forming apparatus according to claim 4, wherein the second controller includes a memory configured to store a first control value corresponding to a first type of the motor as the control value and a second control value corresponding to a second type of the motor different from the first type of the motor as the control value, and
wherein the second controller is configured to:
read, if the type of the motor connected to the driving circuit is discriminated as the first type, the first control value from the memory, and set the first control value as the control value; and
read, if the type of the motor connected to the driving circuit is discriminated as the second type, the second control value from the memory, and set the second control value as the control value.

15. The image forming apparatus according to claim 1, wherein the control value includes a value corresponding to inductance of the winding.

16. The image forming apparatus according to claim 7, wherein the second controller is configured to discriminate a type of the motor connected to the driving circuit based on the driving current detected by the detector in the first mode, and
wherein the second controller is configured to set the control value corresponding to the discriminated type of the motor.

17. The image forming apparatus according to claim 16, wherein the second controller includes a memory configured to store a first control value corresponding to a first type of the motor as the control value and a second control value corresponding to a second type of the motor different from the first type of the motor as the control value,
wherein the second controller is configured to:
read, if the type of the motor connected to the driving circuit is discriminated as the first type, the first control value from the memory, and set the first control value as the control value; and
read, if the type of the motor connected to the driving circuit is discriminated as the second type, the second control value from the memory, and set the second control value as the control value.

18. The image forming apparatus according to claim 7, wherein the control value includes a value corresponding to inductance of the winding.

19. The image forming apparatus according to claim 7, wherein the load is a conveyance roller configured to convey the recording medium.

* * * * *